United States Patent
Nelson et al.

(10) Patent No.: US 9,409,347 B2
(45) Date of Patent: Aug. 9, 2016

(54) METHOD FOR FORMING REINFORCED PULTRUDED PROFILES

(75) Inventors: Sherri M. Nelson, Winona, MN (US); David W. Eastep, Winona, MN (US); Timothy A. Regan, Winona, MN (US)

(73) Assignee: Ticona LLC, Florence, KY (US)

( * ) Notice: Subject to any disclaimer, the term of this patent is extended or adjusted under 35 U.S.C. 154(b) by 449 days.

(21) Appl. No.: 13/697,404

(22) PCT Filed: Jun. 22, 2011

(86) PCT No.: PCT/US2011/041433
§ 371 (c)(1),
(2), (4) Date: Feb. 12, 2013

(87) PCT Pub. No.: WO2011/163349
PCT Pub. Date: Dec. 29, 2011

(65) Prior Publication Data
US 2013/0149521 A1    Jun. 13, 2013

Related U.S. Application Data

(60) Provisional application No. 61/357,289, filed on Jun. 22, 2010.

(51) Int. Cl.
*B32B 1/00* (2006.01)
*B29C 70/08* (2006.01)
(Continued)

(52) U.S. Cl.
CPC ............. *B29C 70/08* (2013.01); *B29C 70/081* (2013.01); *B29C 70/52* (2013.01); *B29C 70/521* (2013.01); *B29C 70/525* (2013.01); *B29B 15/122* (2013.01); *Y10T 428/249921* (2015.04)

(58) Field of Classification Search
CPC ................................ B29C 70/52; B29C 70/08
USPC ...................... 264/135, 137; 428/292.1, 297.4
See application file for complete search history.

(56) References Cited

U.S. PATENT DOCUMENTS

| 3,669,158 A | 6/1972 | Phillips |
| 4,394,338 A | 7/1983 | Fuwa |

(Continued)

FOREIGN PATENT DOCUMENTS

| DE | 102007018052 | 10/2008 |
| EP | 0155552 | 9/1985 |

(Continued)

*Primary Examiner* — Galen Hauth
(74) *Attorney, Agent, or Firm* — Dority & Manning, P.A.

(57) ABSTRACT

A method and apparatus for forming a profile that contains at least one layer of continuous fibers and at least one layer of discontinuous fibers. Said method allowing the selective control of features to achieve a profile that has increased transverse strength and flexural modulus. The layer of continuous fibers may be formed from one or more continuous fiber reinforced ribbons ("CFRT") (12) that contain fibers embedded within a thermoplastic polymer matrix, whereby a void fraction and in turn is minimized and flexural modulus is optimized Further, the ribbon (s) are consolidated so that the continuous fibers remain fixed in alignment in a substantially longitudinal direction (e.g., the direction of pultrusion). In addition to enhancing the tensile properties of the profile, the use of such ribbons also allows an improved handability when placing them into the desired position within the pultrusion die. The discontinuous fibers are also embedded within a thermoplastic matrix, in such a way as to assist in bonding of the layers to achieve the desired strength. At least a portion of the fibers are oriented in the transverse direction to provide increased transverse strength.

31 Claims, 16 Drawing Sheets

(51) Int. Cl.
   *B29C 70/52*     (2006.01)
   *B29B 15/12*    (2006.01)

(56) References Cited

U.S. PATENT DOCUMENTS

| | | |
|---|---|---|
| 4,541,884 A | 9/1985 | Cogswell et al. |
| 4,549,920 A | 10/1985 | Cogswell et al. |
| 4,564,540 A | 1/1986 | Davies et al. |
| 4,588,538 A | 5/1986 | Chung et al. |
| 4,640,065 A | 2/1987 | Harris et al. |
| 4,681,722 A | 7/1987 | Carter et al. |
| 4,749,613 A | 6/1988 | Yamada et al. |
| 4,752,313 A | 6/1988 | Allaire et al. |
| 4,752,513 A | 6/1988 | Rau et al. |
| RE32,772 E | 10/1988 | Hawley |
| 4,792,481 A | 12/1988 | O'Connor et al. |
| 4,874,563 A | 10/1989 | McMahon et al. |
| 4,883,552 A | 11/1989 | O'Connor et al. |
| 4,924,631 A | 5/1990 | Davies et al. |
| 4,938,823 A | 7/1990 | Balazek et al. |
| 4,984,402 A | 1/1991 | Davies |
| 4,992,229 A | 2/1991 | Beever |
| 5,026,410 A | 6/1991 | Pollet et al. |
| 5,026,447 A | 6/1991 | O'Connor |
| 5,091,036 A | 2/1992 | Taylor |
| 5,095,632 A | 3/1992 | Hassler, Jr. et al. |
| 5,098,496 A | 3/1992 | Breitigam et al. |
| 5,114,516 A | 5/1992 | Pilling et al. |
| 5,120,380 A | 6/1992 | Strachan |
| 5,122,417 A | 6/1992 | Murakami et al. |
| 5,128,198 A | 7/1992 | Dyksterhouse et al. |
| 5,174,844 A | 12/1992 | Tong |
| 5,198,172 A | 3/1993 | Spoo et al. |
| 5,225,020 A | 7/1993 | Millett et al. |
| 5,225,140 A | 7/1993 | Hayashikoshi et al. |
| 5,266,139 A * | 11/1993 | Yokota et al. ............ 156/169 |
| 5,294,461 A | 3/1994 | Ishida |
| 5,324,377 A | 6/1994 | Davies |
| 5,336,526 A | 8/1994 | Spoo et al. |
| 5,401,154 A | 3/1995 | Sargent |
| 5,492,583 A | 2/1996 | Fingerson et al. |
| 5,492,743 A | 2/1996 | Schroll et al. |
| 5,503,928 A | 4/1996 | Cheshire |
| 5,520,867 A | 5/1996 | Shirai et al. |
| 5,534,210 A | 7/1996 | Shirai et al. |
| 5,540,986 A | 7/1996 | Kimura et al. |
| 5,552,215 A | 9/1996 | Tredway et al. |
| 5,556,496 A | 9/1996 | Sumerak |
| 5,585,155 A | 12/1996 | Heikkila et al. |
| 5,700,417 A | 12/1997 | Fernyhough et al. |
| 5,716,479 A | 2/1998 | Mikats et al. |
| 5,716,487 A | 2/1998 | Sumerak |
| 5,727,357 A | 3/1998 | Arumugasaamy et al. |
| 5,747,075 A | 5/1998 | Gauchel et al. |
| 5,779,961 A | 7/1998 | Teutsch |
| 5,783,013 A | 7/1998 | Beckman et al. |
| 5,792,529 A | 8/1998 | May |
| 5,830,304 A | 11/1998 | Priesnitz et al. |
| 5,882,564 A | 3/1999 | Puppin |
| 5,902,755 A | 5/1999 | Driggett et al. |
| 5,911,932 A | 6/1999 | Dyksterhouse |
| 5,935,508 A | 8/1999 | Fernyhough et al. |
| 6,007,656 A | 12/1999 | Heikkila et al. |
| 6,037,056 A | 3/2000 | Macdonald et al. |
| 6,045,876 A | 4/2000 | Fellers et al. |
| 6,048,427 A | 4/2000 | Gauchel et al. |
| 6,090,319 A | 7/2000 | Sharma et al. |
| 6,106,944 A | 8/2000 | Heikkila et al. |
| 6,122,877 A | 9/2000 | Hendrickson et al. |
| 6,165,604 A * | 12/2000 | Edwards et al. ............ 428/298.7 |
| 6,185,962 B1 | 2/2001 | Hartman et al. |
| 6,260,251 B1 | 7/2001 | Guhl |
| 6,346,325 B1 | 2/2002 | Edwards et al. |
| 6,387,179 B1 | 5/2002 | Anderson et al. |
| 6,524,690 B1 | 2/2003 | Dyksterhouse |
| 6,656,316 B1 | 12/2003 | Dyksterhouse |
| 6,709,995 B1 | 3/2004 | Dyksterhouse |
| 6,746,747 B2 | 6/2004 | Davies et al. |
| 6,763,869 B2 | 7/2004 | Sakai et al. |
| 6,794,032 B2 | 9/2004 | Borgner et al. |
| 6,808,796 B1 | 10/2004 | Miyao et al. |
| 6,821,613 B1 | 11/2004 | Kagi et al. |
| 6,846,857 B1 | 1/2005 | Lindner |
| 6,854,791 B1 | 2/2005 | Jaggi |
| 6,872,273 B2 | 3/2005 | Davies et al. |
| 6,872,343 B2 | 3/2005 | Edwards et al. |
| 6,881,288 B2 | 4/2005 | Davies et al. |
| 6,955,735 B2 | 10/2005 | Kusek |
| 7,249,943 B2 | 7/2007 | Benson et al. |
| 7,276,132 B2 | 10/2007 | Davies et al. |
| 7,297,740 B2 | 11/2007 | Dyksterhouse |
| 7,387,147 B2 | 6/2008 | Johnson et al. |
| 7,402,268 B2 | 7/2008 | Boissonnat et al. |
| 7,413,623 B2 | 8/2008 | Raday |
| 7,470,388 B2 | 12/2008 | Hüsler et al. |
| 2001/0047844 A1 | 12/2001 | Edwards et al. |
| 2002/0061374 A1 | 5/2002 | O'Brien et al. |
| 2002/0110680 A1 | 8/2002 | Bank et al. |
| 2002/0123288 A1 | 9/2002 | Davies et al. |
| 2003/0003265 A1 | 1/2003 | Davies et al. |
| 2004/0009338 A1 | 1/2004 | Jo et al. |
| 2005/0008804 A1 | 1/2005 | Davies et al. |
| 2006/0165955 A1 | 7/2006 | Ruegg et al. |
| 2006/0280938 A1 | 12/2006 | Atkinson |
| 2007/0113958 A1 | 5/2007 | Brown et al. |
| 2007/0113983 A1 | 5/2007 | Brown et al. |
| 2007/0116941 A1 | 5/2007 | Brown et al. |
| 2007/0125301 A1 | 6/2007 | Zhou et al. |
| 2007/0126142 A1* | 6/2007 | Zhou et al. ............ 264/134 |
| 2007/0183843 A1 | 8/2007 | Spaans et al. |
| 2007/0243368 A1* | 10/2007 | Edwards ............ 428/292.1 |
| 2008/0053056 A1 | 3/2008 | Davies et al. |
| 2008/0300355 A1 | 12/2008 | Kenny et al. |
| 2009/0011210 A1 | 1/2009 | Gao et al. |
| 2009/0023870 A1 | 1/2009 | Berksoy et al. |
| 2009/0071593 A1 | 3/2009 | Slaback et al. |
| 2009/0104418 A1 | 4/2009 | Ohki et al. |
| 2009/0123693 A1 | 5/2009 | Paul |
| 2009/0206515 A1 | 8/2009 | Jansen et al. |
| 2009/0324923 A1 | 12/2009 | Gleich et al. |
| 2010/0108812 A1 | 5/2010 | Boursier et al. |
| 2011/0049750 A1 | 3/2011 | Bechtold |

FOREIGN PATENT DOCUMENTS

| | | |
|---|---|---|
| EP | 0281447 | 9/1988 |
| EP | 0444867 | 9/1991 |
| EP | WO2006/044315 * | 4/2006 |
| FR | 2266595 | 10/1975 |
| GB | 1302049 | 1/1973 |
| GB | 2041489 | 9/1980 |
| GB | 2262470 | 6/1993 |
| GB | 2448363 | 10/2008 |
| JP | H09-155862 | 6/1997 |
| WO | 98/03277 | 3/1992 |
| WO | 00/78529 | 12/2000 |
| WO | 2004/080698 | 9/2004 |
| WO | 2006/044315 | 4/2006 |

* cited by examiner

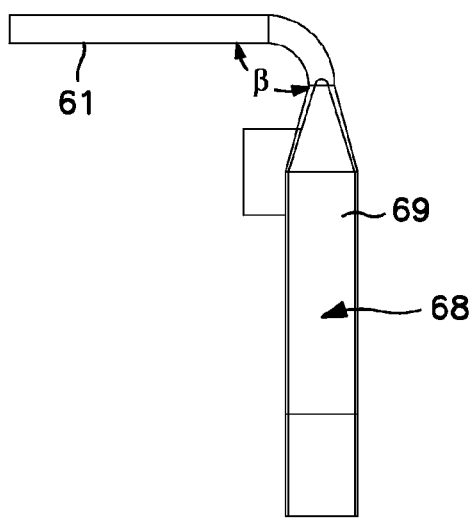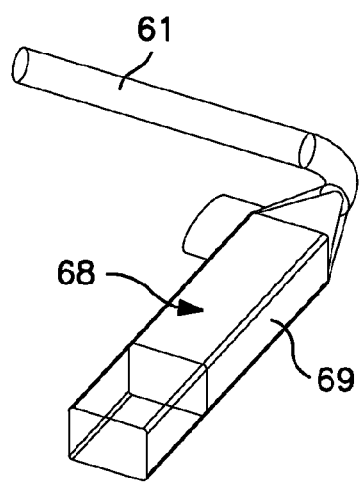
FIG. 6  FIG. 7

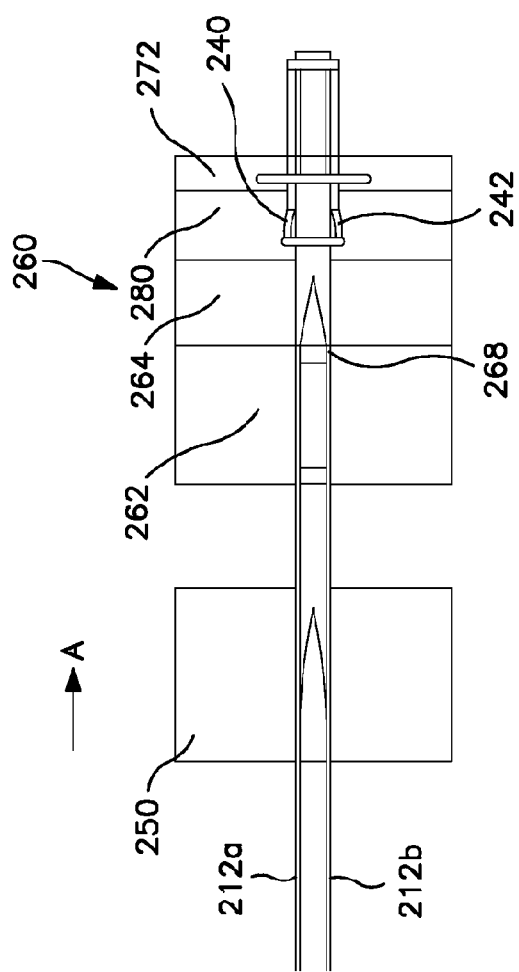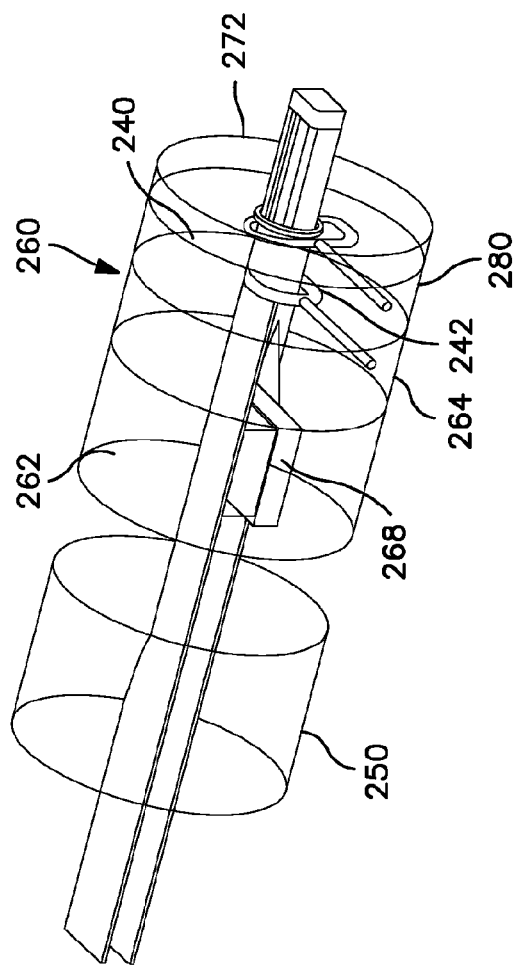

METHOD FOR FORMING REINFORCED PULTRUDED PROFILES

RELATED APPLICATIONS

The present application claims priority to Provisional Application Ser. No. 61/357,289,filed on Jun. 22, 2010, the entire contents of which are incorporated herein by reference thereto.

BACKGROUND OF THE INVENTION

Fiber reinforced profiles are often formed by pulling ("pultruding") continuous fibers through a resin and then shaping the fiber-reinforced resin within a pultrusion die. Because the profiles have continuous fibers oriented in the machine direction (longitudinal), they often exhibit a high tensile strength in the machine direction. The transverse strength properties of such profiles however, are often poor, which can cause the material to split when a stress is applied in a cross-machine direction (transverse). In this regard, various attempts have been made to strengthen profiles in the transverse direction. For example, U.S. Pat. No. 7,514,135 to Davies, et al. describes a pultruded part formed by providing a first layer of reinforcing rovings extending in a longitudinal pultrusion direction and forming a second layer on the first layer, the second layer containing at least some reinforcing fibers that extend in the transverse direction. One problem with this method, however, it is that it relies upon a thermoset resin to help achieve the desired strength properties. Such resins are difficult to use during manufacturing and do not always possess good bonding characteristics for forming layers with other materials. Furthermore, the method described therein is also problematic in that it is difficult to apply the transverse fibers at selective locations (e.g., where they are needed).

As such, a need currently exists for a method and apparatus of forming a pultruded profile that contains a continuous fiber layer and a discontinuous fiber layer.

SUMMARY OF THE INVENTION

In accordance with one embodiment of the present invention, a method for forming a pultruded profile having a cross-sectional shape is disclosed. The method comprises pulling a continuous fiber ribbon through a pultrusion die in a longitudinal direction, wherein the continuous fiber ribbon contains continuous fibers that are substantially oriented in the longitudinal direction and embedded within a first thermoplastic polymer matrix. A discontinuous fiber material is introduced into the pultrusion die, wherein the discontinuous fiber material contains discontinuous fibers embedded within a second thermoplastic matrix. Within the pultrusion die, the discontinuous fiber material and the continuous fiber ribbon are combined to form first and second layers of the profile. The first layer is positioned adjacent to the second layer and contains the discontinuous fiber material. The second layer includes the continuous fiber ribbon.

In accordance with another embodiment of the present invention, a pultrusion apparatus for forming a profile is disclosed. The apparatus comprises a pultrusion die that defines an interior cavity, a pulling device that is configured to pull one or more continuous fiber ribbons through the interior cavity of the pultrusion die, a cross-head extrusion device that is configured to extrude a discontinuous fiber material into the interior cavity of the pultrusion die, and a mandrel positioned within the interior cavity of the pultrusion die. The mandrel has a first section over which the discontinuous fiber material is configured to flow to form a first layer of the profile and a second section over which the continuous fiber ribbon is configured to flow to form a second layer of the profile.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 6 is a top view of one embodiment of a mandrel that may be employed in the present invention to shape the discontinuous fiber layer, wherein the flow of the discontinuous fiber material is also illustrated as it passes over the mandrel;

FIG. 7 is a perspective view of the mandrel section of FIG. 6;

FIG. 10 is another perspective view of the mandrel section of FIG. 8, in which

FIG. 13 is side view of one embodiment of a pre-shaping and pultrusion die system that may be employed to form the profile of FIG. 12;

FIG. 14 is perspective view of the pre-shaping and pultrusion die system of FIG. 13;

Figure 1:
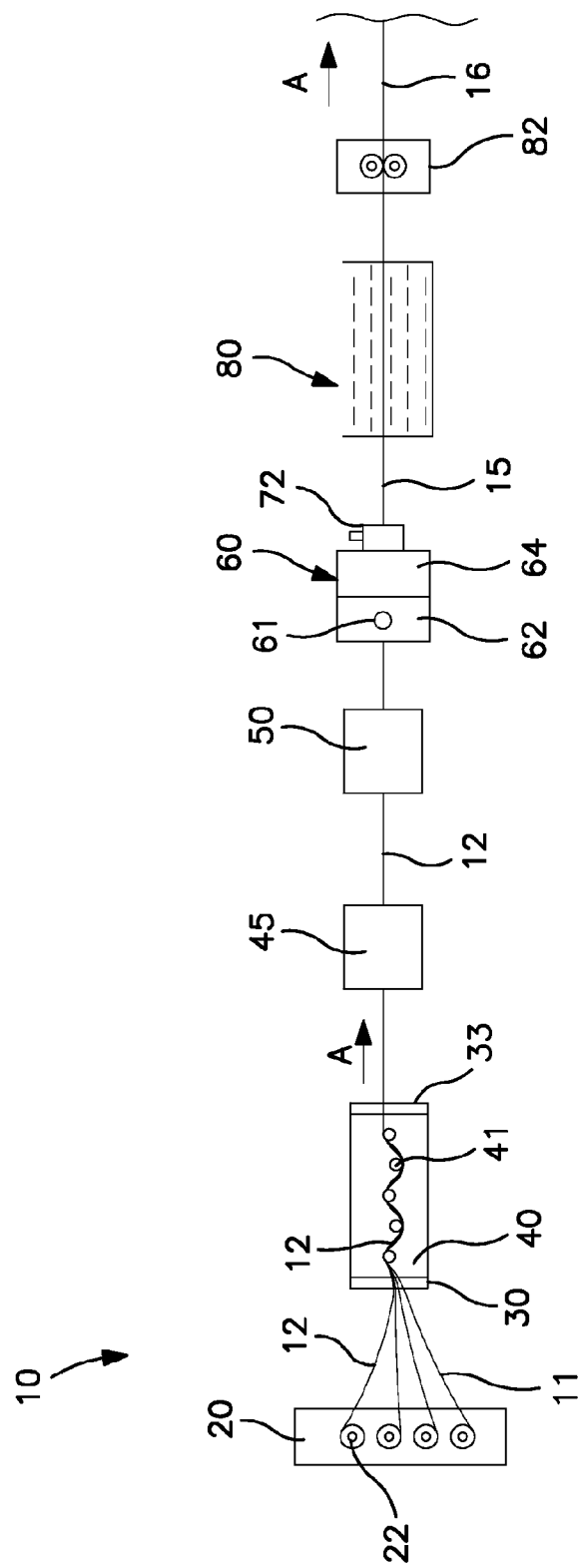
FIG. 1 is a schematic illustration of one embodiment of a pultrusion system that may be employed in the present invention.

Repeat use of reference characters in the present specification and drawings is intended to represent the same or analogous features or elements of the present invention.

DETAILED DESCRIPTION OF REPRESENTATIVE EMBODIMENTS

Definitions

As used herein, the term "profile" generally refers to a pultruded part. The profile may be hollow or solid, and may possess a wide variety of cross-sectional shapes, such as square, rectangular, circular, elliptical, triangular, I-shaped, C-shaped, U-shaped, J-shaped, L-shaped, slotted, etc. Such profiles may be employed as a structural member for window lineals, decking planks, railings, balusters, roofing tiles, siding, trim boards, pipe, fencing, posts, light posts, highway signage, roadside marker posts, etc.

As used herein, the term "hollow" generally means that at least a portion of the interior of the profile is a voided space. The voided space may optionally extend the entire the length of the profile.

As used herein, the term "continuous fibers" generally refers to fibers, filaments, yarns, or rovings (e.g., bundles of fibers) having a length that is generally limited only by the length of the part. For example, such fibers may have a length greater than about 25 millimeters, in some embodiments about 50 millimeters or more, and in some embodiments, about 100 millimeters or more.

As used herein, the term "discontinuous fibers" generally refers to fibers, filaments, yarns, or rovings that are not continuous. Such fibers typically have a length of about 25 millimeters or less. For example, discontinuous fibers may include short or long fibers. "Long fibers" are typically those fibers having a length of from about 0.5 to about 25 millimeters, in some embodiments, from about 0.8 to about 15 millimeters, and in some embodiments, from about 1 to about 12 millimeters. "Short fibers" are typically those fibers having a length of about 0.5 millimeter or less, in some embodiments about 0.01 to about 0.4 millimeters, and in some embodiments, from about 0.05 to about 0.3 millimeters.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a method and apparatus for forming a profile that contains at least one layer of continuous fibers and at least one layer of discontinuous fibers. Various features of the method are selectively controlled to achieve a profile that has increased transverse strength and flexural modulus. For example, the layer of continuous fibers is formed from one or more continuous fiber reinforced ribbons ("CFRT") that contain fibers embedded within a thermoplastic polymer matrix. The fibers are embedded within the matrix by a process that minimizes void fraction and in turn, optimizes flexural modulus. Further, the ribbon(s) are consolidated so that the continuous fibers remain fixed in alignment in a substantially longitudinal direction (e.g., the direction of pultrusion). In addition to enhancing the tensile properties of the profile, the use of such ribbons also allows the continuous fiber material to be more readily manipulated and placed into the desired position within the pultrusion die. The discontinuous fibers are also embedded within a thermoplastic matrix. Among other things, this may assist in bonding of the layers so that an adhesive is not required to achieve the desired strength. Also, rather being oriented in the longitudinal direction, at least a portion of the fibers are oriented in the transverse direction to provide increased transverse strength.

Through the method and apparatus of the present invention, the formation of a wide variety of complex shapes and sizes is possible with little difficulty and without adversely impacting the strength properties of the resulting profile. Various embodiments of the present invention will now be described in more detail.

The continuous and discontinuous fibers employed in the profile may be formed from the same or different materials. Such materials may include any conventional material known in the art, such as metal fibers; glass fibers (e.g., E-glass, A-glass, C-glass, D-glass, AR-glass, R-glass, S1-glass, S2-glass), carbon fibers (e.g., graphite), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic compositions. Glass fibers and carbon fibers are particularly desirable for use in the continuous and/or discontinuous fibers. Such fibers often have a nominal diameter of about 4 to about 35 micrometers, and in some embodiments, from about 9 to about 35 micrometers. The fibers may be twisted or straight. If desired, the fibers may be in the form of rovings (e.g., bundle of fibers) that contain a single fiber type or different types of fibers. Different fibers may be contained in individual rovings or, alternatively, each roving may contain a different fiber type. For example, in one embodiment, certain rovings may contain continuous carbon fibers, while other rovings may contain glass fibers. The number of fibers contained in each roving can be constant or vary from roving to roving. Typically, a roving may contain from about 1,000 fibers to about 50,000 individual fibers, and in some embodiments, from about 2,000 to about 40,000 fibers.

Any of a variety of thermoplastic polymers may be employed to form the thermoplastic matrices in which the continuous and discontinuous fibers are embedded. Suitable thermoplastic polymers for use in the present invention may include, for instance, polyolefins (e.g., polypropylene, propylene-ethylene copolymers, etc.), polyesters (e.g., polybutylene terephalate ("PBT")), polycarbonates, polyamides (e.g., Nylon™), polyether ketones (e.g., polyetherether ketone ("PEEK")), polyetherimides, polyarylene ketones (e.g., polyphenylene diketone ("PPDK")), liquid crystal polymers, polyarylene sulfides (e.g., polyphenylene sulfide ("PPS")), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), and so forth. ABS is a particularly suitable thermoplastic polymer. It should be understood that the polymer(s) employed to form the continuous and discontinuous fiber materials may be the same or different.

To minimize the void fraction of the continuous fiber ribbon and ensure good impregnation, an extrusion device may be employed in the present invention to embed the continuous fibers into a thermoplastic matrix. Among other things, the extrusion device facilitates the ability of the thermoplastic polymer to be applied to the entire surface of the fibers. For instance, the void fraction may be about 3% or less, in some embodiments about 2% or less, and in some embodiments, about 1% or less. The void fraction may be measured using techniques well known to those skilled in the art. For example, the void fraction may be measured using a "resin burn off" test in which samples are placed in an oven (e.g., at 600° C. for 3 hours) to burn out the resin. The mass of the remaining fibers may then be measured to calculate the weight and volume fractions. Such "burn off" testing may be performed in accordance with ASTM D 2584-08 to determine the weights of the fibers and the thermoplastic matrix, which may then be used to calculate the "void fraction" based on the following equations:

$$V_f = 100*(\rho_t - \rho_c)/\rho_t$$

where, $V_f$ is the void fraction as a percentage;

$\rho_c$ is the density of the composite as measured using known techniques, such as with a liquid or gas pycnometer (e.g., helium pycnometer);

$\rho_t$ is the theoretical density of the composite as is determined by the following equation:

$$\rho_t = 1/[W_f/\rho_f + m/\rho_m]$$

$\rho_m$ is the density of the thermoplastic matrix (e.g., at the appropriate crystallinity);

$\rho_f$ is the density of the fibers;

$W_f$ is the weight fraction of the fibers; and $W_m$ is the weight fraction of the thermoplastic matrix.

Alternatively, the void fraction may be determined by chemically dissolving the resin in accordance with ASTM D 3171-09. The "burn off" and "dissolution" methods are particularly suitable for glass fibers, which are generally resistant to melting and chemical dissolution. In other cases, however, the void fraction may be indirectly calculated based on the densities of the thermoplastic polymer, fibers, and ribbon in accordance with ASTM D 2734-09 (Method A), where the densities may be determined ASTM D792-08 Method A. Of course, the void fraction can also be estimated using conventional microscopy equipment.

Figure 2:
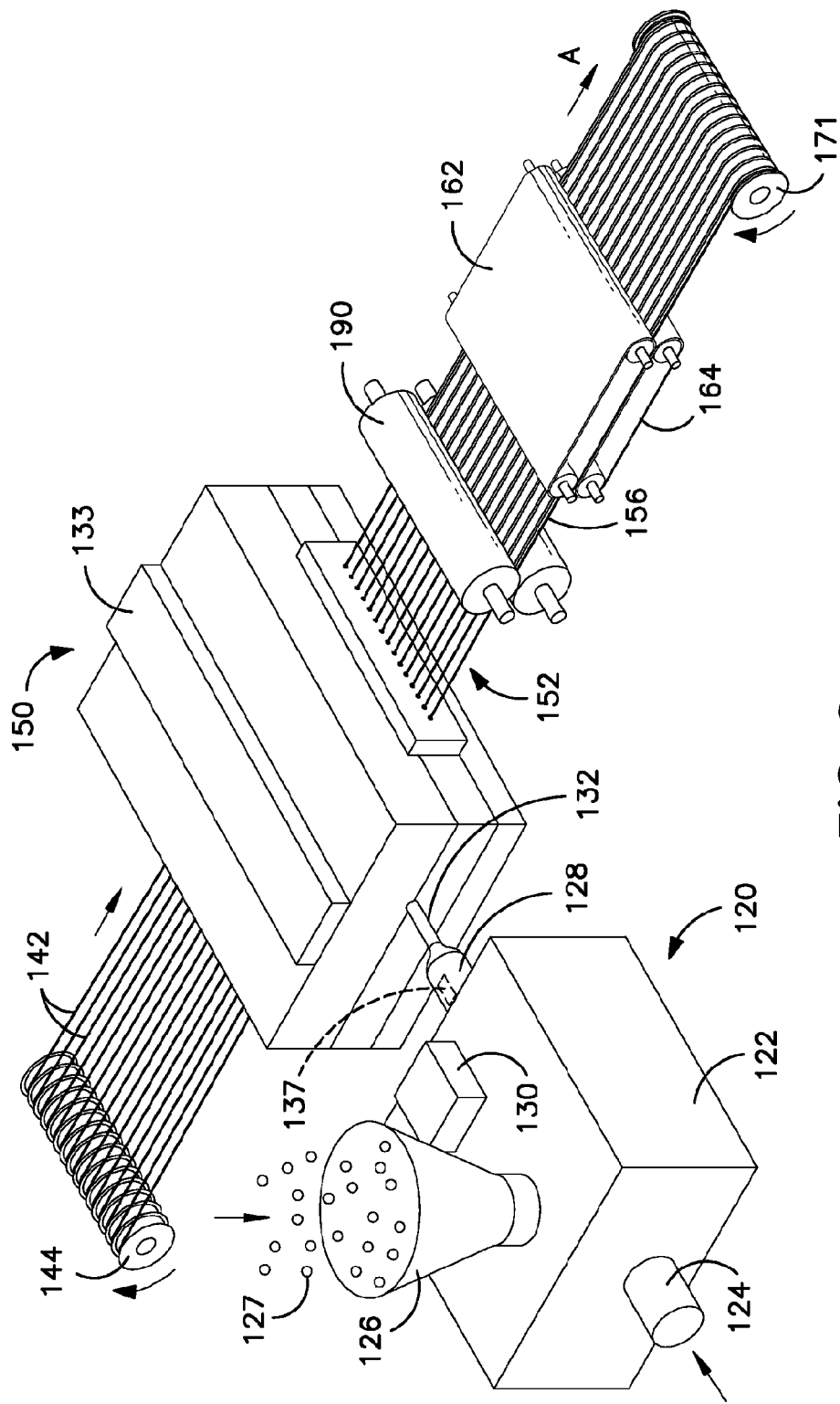
FIG. 2 is a schematic illustration of one embodiment of an impregnation system for use in the present invention.

Referring to FIG. 2, one embodiment of an extrusion device is shown that may be employed for impregnating the fibers with a thermoplastic polymer. More particularly, the apparatus includes an extruder 120 containing a screw shaft 124 mounted inside a barrel 122. A heater 130 (e.g., electrical resistance heater) is mounted outside the barrel 122. During use, a thermoplastic polymer feedstock 127 is supplied to the extruder 120 through a hopper 126. The thermoplastic feedstock 127 is conveyed inside the barrel 122 by the screw shaft 124 and heated by frictional forces inside the barrel 122 and by the heater 130. Upon being heated, the feedstock 127 exits the barrel 122 through a barrel flange 128 and enters a die flange 132 of an impregnation die 150.

A continuous fiber roving 142 or a plurality of continuous fiber rovings 142 are supplied from a reel or reels 144 to die 150. The rovings 142 are generally kept apart a certain distance before impregnation, such as at least about 4 millimeters, and in some embodiments, at least about 5 millimeters. The feedstock 127 may further be heated inside the die by heaters 133 mounted in or around the die 150. The die is generally operated at temperatures that are sufficient to cause melting and impregnation of the thermoplastic polymer. Typically, the operation temperatures of the die is higher than the melt temperature of the thermoplastic polymer, such as at temperatures from about 200° C. to about 450° C. When processed in this manner, the continuous fiber rovings 142 become embedded in the polymer matrix, which may be a resin 214 (FIG. 3A) processed from the feedstock 127. The mixture is then extruded from the impregnation die 150 to create an extrudate 152.

A pressure sensor 137 (FIG. 3A) senses the pressure near the impregnation die 150 to allow control to be exerted over the rate of extrusion by controlling the rotational speed of the screw shaft 124, or the federate of the feeder. That is, the pressure sensor 137 is positioned near the impregnation die 150 so that the extruder 120 can be operated to deliver a correct amount of resin 214 for interaction with the fiber rovings 142. After leaving the impregnation die 150, the extrudate 152, or impregnated fiber rovings 142, may enter an optional pre-shaping, or guiding section (not shown) before entering a nip formed between two adjacent rollers 190. Although optional, the rollers 190 can help to consolidate the extrudate 152 into the form of a ribbon (or tape), as well as enhance fiber impregnation and squeeze out any excess voids. In addition to the rollers 190, other shaping devices may also be employed, such as a die system. The resulting consolidated ribbon 156 is pulled by tracks 162 and 164 mounted on rollers. The tracks 162 and 164 also pull the extrudate 152 from the impregnation die 150 and through the rollers 190. If desired, the consolidated ribbon 156 may be wound up at a section 171. Generally speaking, the ribbons are relatively thin and typically have a thickness of from about 0.05 to about 1 millimeter, in some embodiments from about 0.1 to about 0.8 millimeters, and in some embodiments, from about 0.2 to about 0.4 millimeters.

Within the impregnation die, it is generally desired that the rovings 142 are traversed through an impregnation zone 250 to impregnate the rovings with the polymer resin 214. In the impregnation zone 250, the polymer resin may be forced generally transversely through the rovings by shear and pressure created in the impregnation zone 250, which significantly enhances the degree of impregnation. This is particularly useful when forming a composite from ribbons of a high fiber content, such as about 35% weight fraction ("Wf") or more, and in some embodiments, from about 40% Wf or more. Typically, the die 150 will include a plurality of contact surfaces 252, such as for example at least 2, at least 3, from 4 to 7, from 2 to 20, from 2 to 30, from 2 to 40, from 2 to 50, or more contact surfaces 252, to create a sufficient degree of penetration and pressure on the rovings 142. Although their particular form may vary, the contact surfaces 252 typically possess a curvilinear surface, such as a curved lobe, rod, etc. The contact surfaces 252 are also typically made of a metal material.

Figure 3A:
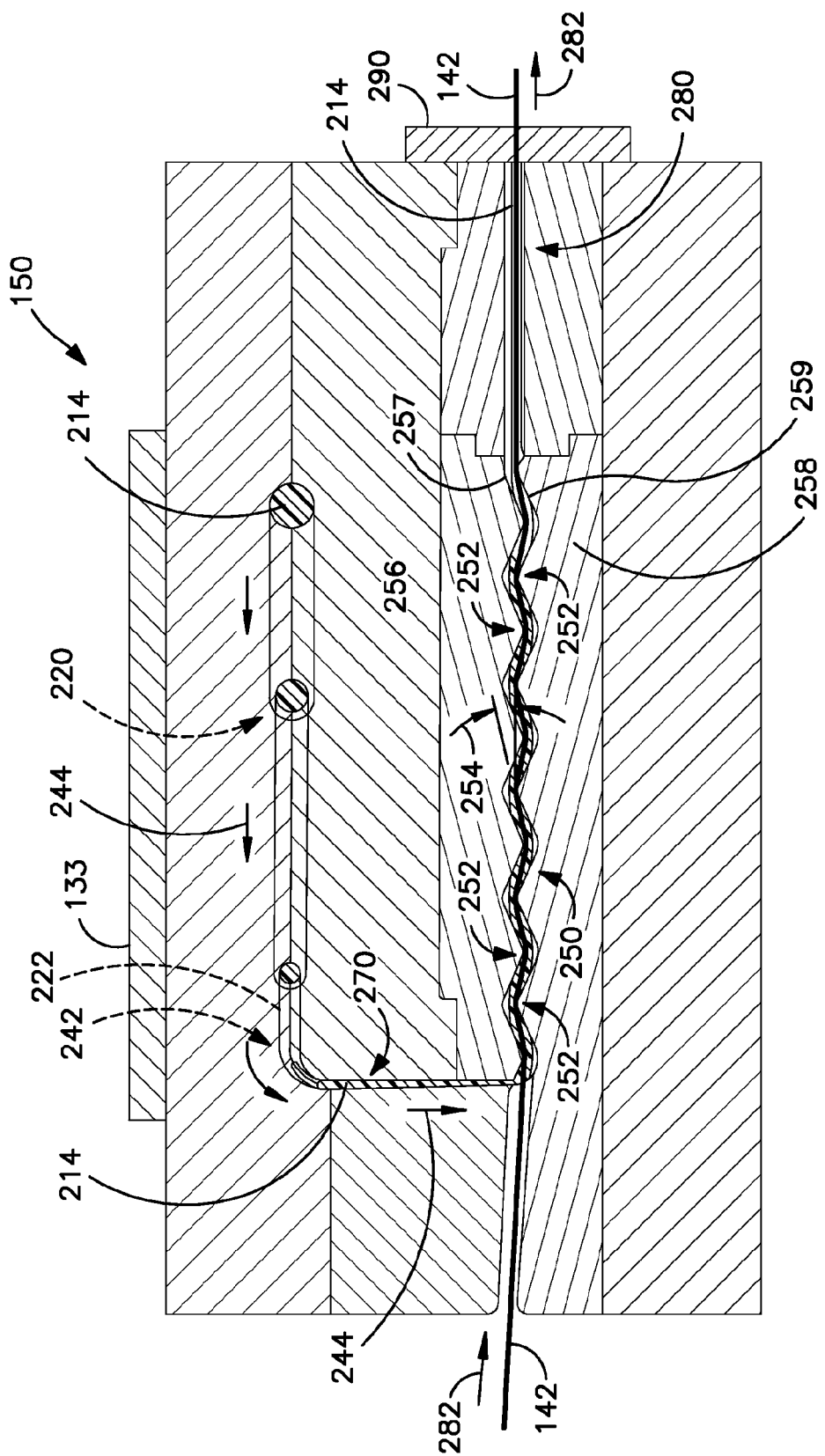
FIG. 3A is a cross-sectional view of the impregnation die shown in FIG. 2.

FIG. 3A shows a cross-sectional view of an impregnation die 150. As shown, the impregnation die 150 includes a manifold assembly 220, a gate passage 270, and an impregnation zone 250. The manifold assembly 220 is provided for flowing the polymer resin 214 therethrough. For example, the manifold assembly 220 may include a channel 222 or a plurality of channels 222. The resin 214 provided to the impregnation die 150 may flow through the channels 222.

Figure 3B:
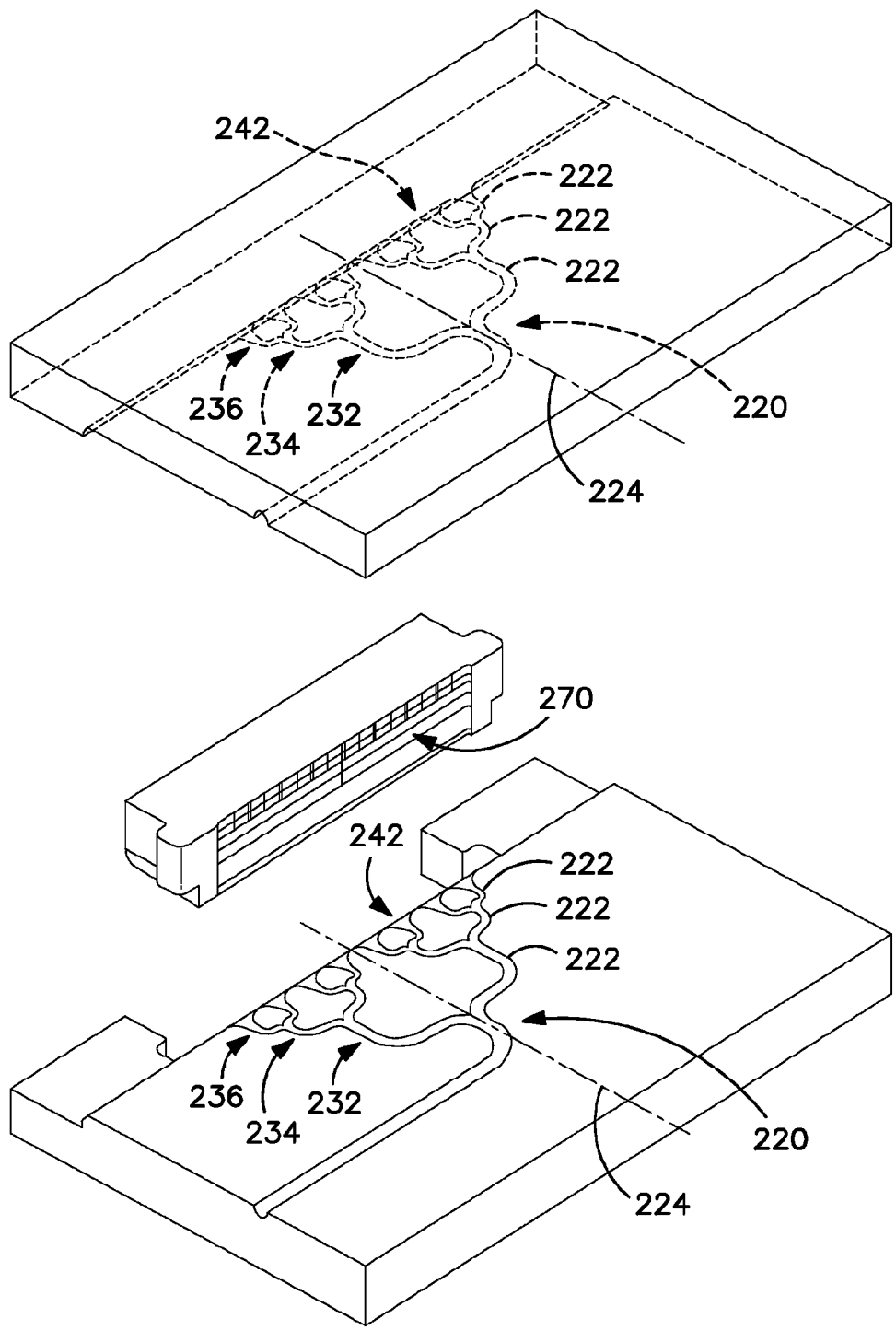
FIG. 3B is an exploded view of one embodiment of a manifold assembly and gate passage for an impregnation die that may be employed in the present invention.

As shown in FIG. 3B, some portions of the channels 222 may be curvilinear, and in exemplary embodiments, the channels 222 have a symmetrical orientation along a central axis 224. Further, in some embodiments, the channels may be a plurality of branched runners 222, which may include first branched runner group 232, second group 234, third group 236, and, if desired, more branched runner groups. Each group may include 2, 3, 4 or more runners 222 branching off from runners 222 in the preceding group, or from an initial channel 222.

The branched runners 222 and the symmetrical orientation thereof generally evenly distribute the resin 214, such that the flow of resin 214 exiting the manifold assembly 220 and coating the rovings 142 is substantially uniformly distributed on the rovings 142. This desirably allows for generally uniform impregnation of the rovings 142.

Further, the manifold assembly 220 may in some embodiments define an outlet region 242, which generally encompasses at least a downstream portion of the channels or runners 222 from which the resin 214 exits. In some embodiments, at least a portion of the channels or runners 222 disposed in the outlet region 242 have an increasing area in a flow direction 244 of the resin 214. The increasing area allows for diffusion and further distribution of the resin 214 as the resin 214 flows through the manifold assembly 220, which further allows for substantially uniform distribution of the resin 214 on the rovings 142.

As further illustrated in FIGS. 3A and 3B, after flowing through the manifold assembly 220, the resin 214 may flow through gate passage 270. Gate passage 270 is positioned between the manifold assembly 220 and the impregnation zone 250, and is provided for flowing the resin 214 from the manifold assembly 220 such that the resin 214 coats the rovings 142. Thus, resin 214 exiting the manifold assembly 220, such as through outlet region 242, may enter gate passage 270 and flow therethrough, as shown.

Upon exiting the manifold assembly 220 and the gate passage 270 of the die 150 as shown in FIG. 3A, the resin 214 contacts the rovings 142 being traversed through the die 150. As discussed above, the resin 214 may substantially uniformly coat the rovings 142, due to distribution of the resin 214 in the manifold assembly 220 and the gate passage 270. Further, in some embodiments, the resin 214 may impinge on an upper surface of each of the rovings 142, or on a lower surface of each of the rovings 142, or on both an upper and lower surface of each of the rovings 142. Initial impingement on the rovings 142 provides for further impregnation of the rovings 142 with the resin 214.

Figure 3C:
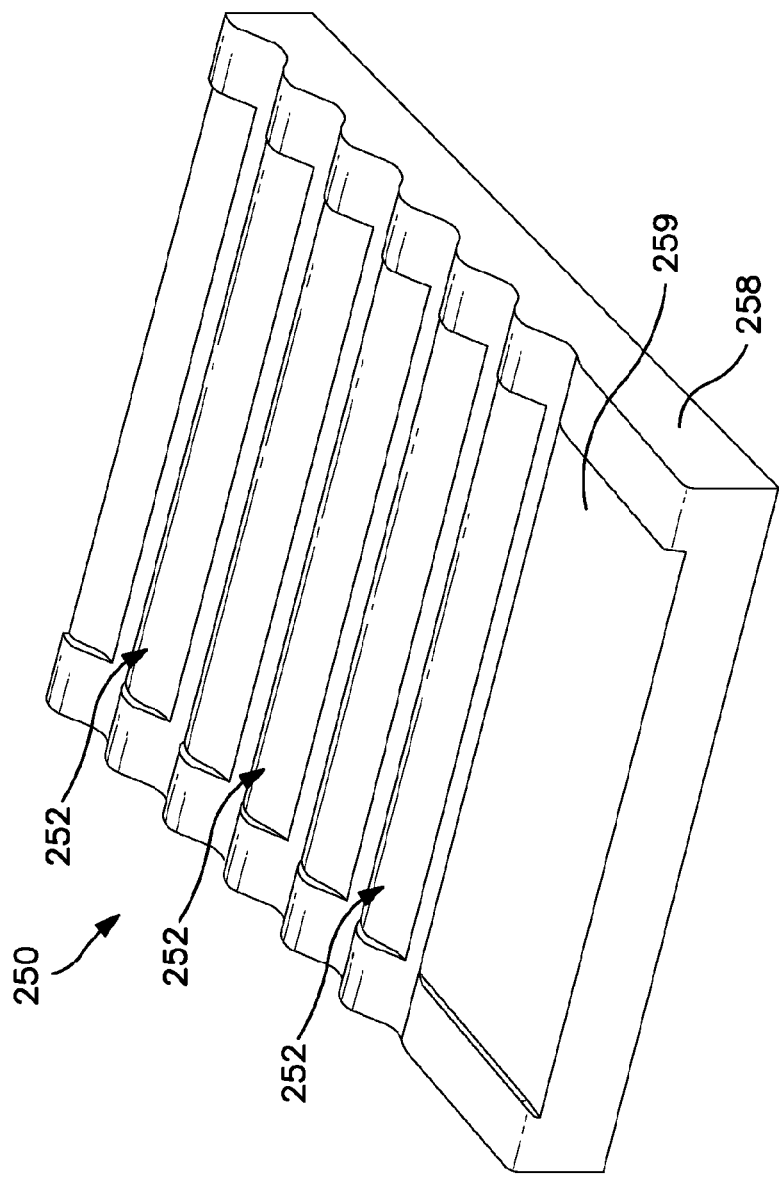
FIG. 3C is a perspective view of one embodiment of a plate at least partially defining an impregnation zone that may be employed in the present invention.

As shown in FIG. 3A, the coated rovings 142 are traversed in run direction 282 through impregnation zone 250, which is configured to impregnate the rovings 142 with the resin 214. For example, as shown in FIGS. 3A and 3C, the rovings 142 are traversed over contact surfaces 252 in the impregnation zone. Impingement of the rovings 142 on the contact surface 252 creates shear and pressure sufficient to impregnate the rovings 142 with the resin 214 coating the rovings 142.

In some embodiments, as shown in FIG. 3A, the impregnation zone 250 is defined between two spaced apart opposing plates 256 and 258. First plate 256 defines a first inner surface 257, while second plate 258 defines a second inner surface 259. The contact surfaces 252 may be defined on or extend from both the first and second inner surfaces 257 and 259, or only one of the first and second inner surfaces 257 and 259. FIG. 3C illustrates the second plate 258 and the various contact surfaces thereon that form at least a portion of the impregnation zone 250 according to these embodiments. In exemplary embodiments, as shown in FIG. 3A, the contact surfaces 252 may be defined alternately on the first and second surfaces 257 and 259 such that the rovings alternately impinge on contact surfaces 252 on the first and second surfaces 257 and 259. Thus, the rovings 142 may pass contact surfaces 252 in a waveform, tortuous or sinusoidual-type pathway, which enhances shear.

The angle 254 at which the rovings 142 traverse the contact surfaces 252 may be generally high enough to enhance shear, but not so high to cause excessive forces that will break the fibers. Thus, for example, the angle 254 may be in the range between approximately 1° and approximately 30°, and in some embodiments, between approximately 5° and approximately 25°.

In alternative embodiments, the impregnation zone 250 may include a plurality of pins (not shown), each pin having a contact surface 252. The pins may be static, freely rotational, or rotationally driven. In further alternative embodiments, the contact surfaces 252 and impregnation zone 250 may comprise any suitable shapes and/or structures for impregnating the rovings 142 with the resin 214 as desired or required.

To further facilitate impregnation of the rovings 142, they may also be kept under tension while present within the impregnation die. The tension may, for example, range from about 5 to about 300 Newtons, in some embodiments from about 50 to about 250 Newtons, and in some embodiments, from about 100 to about 200 Newtons per roving 142 or tow of fibers.

As shown in FIG. 3A, in some embodiments, a land zone 280 may be positioned downstream of the impregnation zone 250 in run direction 282 of the rovings 142. The rovings 142 may traverse through the land zone 280 before exiting the die 150. As further shown in FIG. 3A, in some embodiments, a faceplate 290 may adjoin the impregnation zone 250. Faceplate 290 is generally configured to meter excess resin 214 from the rovings 142. Thus, apertures in the faceplate 290, through which the rovings 142 traverse, may be sized such that when the rovings 142 are traversed therethrough, the size of the apertures causes excess resin 214 to be removed from the rovings 142.

The impregnation die shown and described above is but one of various possible configurations that may be employed in the present invention. In alternative embodiments, for example, the fibers may be introduced into a crosshead die that is positioned at an angle relative to the direction of flow of the polymer melt. As the fibers move through the crosshead die and reach the point where the polymer exits from an extruder barrel, the polymer is forced into contact with the fibers. It should also be understood that any other extruder design may also be employed, such as a twin screw extruder. Still further, other components may also be optionally employed to assist in the impregnation of the fibers. For example, a "gas jet" assembly may be employed in certain embodiments to help uniformly spread a bundle or tow of individual fibers, which may each contain up to as many as 24,000 fibers, across the entire width of the merged tow. This helps achieve uniform distribution of strength properties in the ribbon. Such an assembly may include a supply of compressed air or another gas that impinges in a generally perpendicular fashion on the moving fiber tows that pass across the exit ports. The spread fiber bundles may then be introduced into a die for impregnation, such as described above.

Regardless of the technique employed, the continuous fibers are oriented in the longitudinal direction (the machine direction "A" of the system of FIG. 1) to enhance tensile strength. Besides fiber orientation, other aspects of the ribbon and pultrusion process are also controlled to achieve the desired strength. For example, a relatively high percentage of continuous fibers may be employed in the ribbon to provide enhanced strength properties. For instance, continuous fibers typically constitute from about 40 wt. % to about 90 wt. %, in some embodiments from about 50 wt. % to about 85 wt. %, and in some embodiments, from about 55 wt. % to about 75 wt. % of the ribbon. Likewise, thermoplastic polymer(s) typically constitute from about 10 wt. % to about 60 wt. %, in some embodiments from about 15 wt. % to about 50 wt. %, and in some embodiments, from about 25 wt. % to about 45 wt. % of the ribbon.

Furthermore, a combination of multiple continuous fibers ribbons may be employed that are laminated together to form a strong, integrated structure having the desired thickness. The number of ribbons employed may vary based on the desired thickness and strength of the profile, as well as the nature of the ribbons themselves. In most cases, however, the number of ribbons is from 2 to 40, in some embodiments from 3 to 30, and in some embodiments, from 4 to 25.

As stated above, the discontinuous fiber material is also embedded within a thermoplastic matrix. For example, the discontinuous fiber material may be a long fiber reinforced thermoplastic ("LFRT") or a short fiber reinforced thermoplastic ("SFRT"). As is well known to those skilled in the art, LFRT may be formed by impregnating fibers in the manner described above, and thereafter cooling the impregnated fibers and chopping them into pellets having a length of about 25 millimeters or less. SFRT may be formed by simply melt blending the thermoplastic polymer with short fibers using conventional extrusion compounding methods. The relative weight percentages of the thermoplastic polymer(s) and fibers may be within the ranges noted above. Regardless of how they are formed, at least a portion of the discontinuous fibers are oriented at an angle relative to the longitudinal direction (i.e., pultrusion direction) to provide increased transverse strength. For example, about 10% or more, in some embodiments about 20% or more, and in some embodiments, about 30% or more of the fibers may be oriented at an angle relative to the longitudinal direction. This angle may, for instance, be about 10° to about 120°, in some embodiments from about 20° to about 110° C., and in one embodiment, about 90°. This may be accomplished by intentionally orienting the fibers in the desired direction, or by random distribution.

Once formed, the continuous fiber ribbon and discontinuous fiber material may then be supplied to the pultrusion system of the present invention. It should also be understood that the aforementioned steps may be formed in-line with the formation of the profile. In such embodiments, certain of the components described and shown in FIG. 2 may not be employed. In one embodiment, for example, the extrudate 152 exiting the impregnation die 150 may be directly supplied to the system used to form the profiles of the present invention.

Referring to FIG. 1, one particular embodiment of a system is shown in which one or more continuous fiber ribbons 12 are initially provided in a wound package on a creel 20. The creel 20 may be an unreeling creel that includes a frame provided with horizontal rotating spindles 22, each supporting a package. A pay-out creel may also be employed, particularly if desired to induce a twist into the fibers. It should also be understood that the ribbons may also be formed in-line with the formation of the profile. In one embodiment, for example, the extrudate 152 exiting the impregnation die 150 from FIG. 2 may be directly supplied to the system used to form a profile. A tension-regulating device 40 may also be employed to help control the degree of tension in the ribbons 12. The device 40 may include inlet plate 30 that lies in a vertical plane parallel to the rotating spindles 22 of the creel 20. The tension-regulating device 40 may contain cylindrical bars 41 arranged in a staggered configuration so that the ribbons 12 passes over and under these bars to define a wave pattern. The height of the bars can be adjusted to modify the amplitude of the wave pattern and control tension.

If desired, the ribbons 12 may be heated in an oven 45 having any of a variety of known configuration, such as an infrared oven, convection oven, etc. During heating, the fibers are unidirectionally oriented to optimize the exposure to the heat and maintain even heat across the entire profile. The temperature to which the ribbons 12 are heated is generally high enough to soften the thermoplastic polymer to an extent that the ribbons can bond together. However, the temperature is not so high as to destroy the integrity of the material. The temperature may, for example, range from about 100° C. to about 300° C., in some embodiments from about 110° C. to about 275° C., and in some embodiments, from about 120° C. to about 250° C. In one particular embodiment, for example, acrylonitrile-butadiene-styrene (ABS) is used as the polymer, and the ribbons are heated to or above the melting point of ABS, which is about 105° C. In another embodiment, polybutylene terephalate (PBT) is used as the polymer, and the ribbons are heated to or above the melting point of PBT, which is about 224° C.

Figure 4:
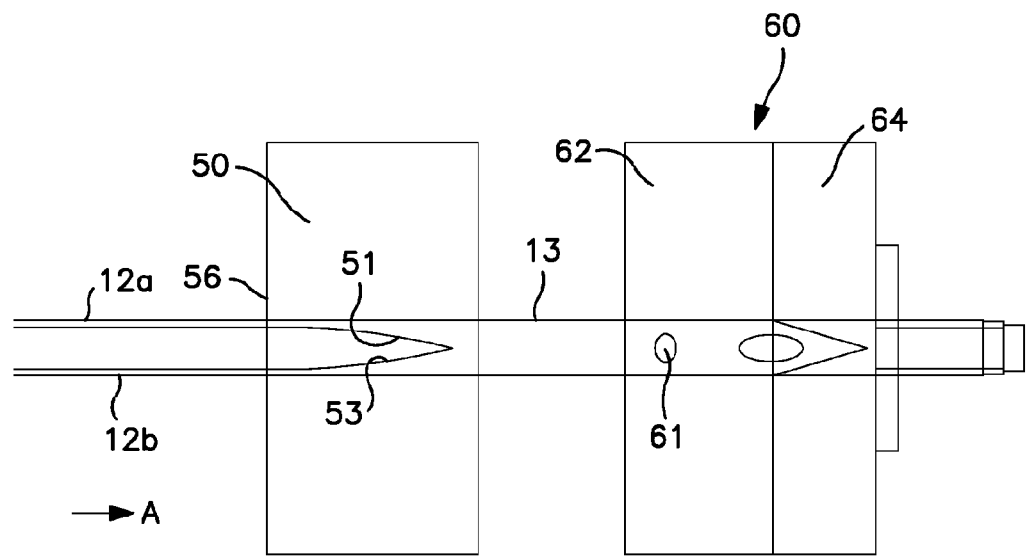
FIG. 4 is a side view of one embodiment of pre-shaping and pultrusion dies that may be employed in the present invention, wherein the flow of the continuous and discontinuous fiber materials are illustrated as they pass through the dies.
Figure 5:
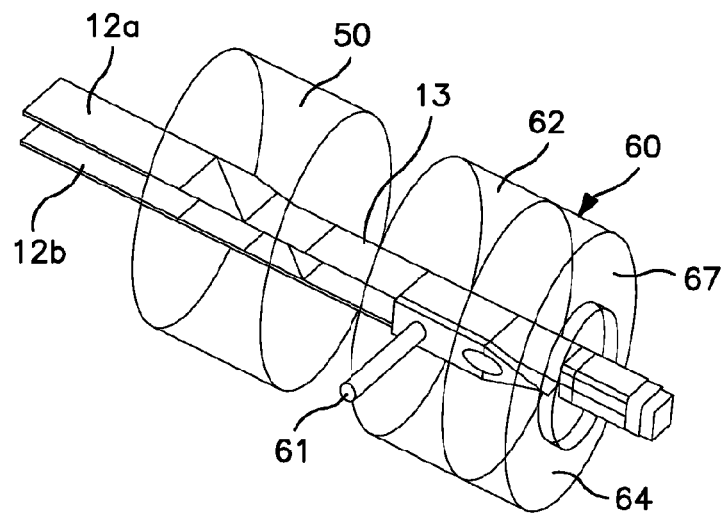
FIG. 5 is a perspective view of the dies of FIG. 4.

Upon being heated, the continuous fiber ribbons 12 may be provided to a consolidation die to help bond together different ribbon layers, as well as for alignment and formation of the initial shape of the profile. Referring to FIGS. 1, 4, and 5, for example, one embodiment of a consolidation die 50 for use in forming a "hollow" profile is shown in more detail. Although referred to herein as a single die, it should be understood that the consolidation die 50 may in fact be formed from multiple individual dies (e.g., face plate dies). In this particular embodiment, the consolidation die 50 receives a first layer (or laminate) 12a of continuous fiber ribbons and a second layer (or laminate) 12b of continuous fiber ribbons at an inlet end 56. The ribbons within each layer are bonded together and guided through channels (not shown) of the die 50 in a direction "A". The channels may be provided in any of a variety of orientations and arrangements to result in the desired reinforcement scheme. In the illustrated embodiment, for example, the layers 12a and 12b are initially spaced apart from each other in the vertical direction. As they pass through the channels of the die 50, the widths of the layers 12a and/or 12b are optionally ribboned to help prevent pressure wedges, and to keep the continuous fibers aligned and twist-free. Within the die 50, the ribbons are generally maintained at a temperature at or above the melting point of the thermoplastic matrix used in the ribbon to ensure adequate consolidation.

Although not specifically shown in FIGS. 1, 4, and 5, a mandrel may also be provided in the interior of the consolidation die 50 to help guide the laminates 12a and 12b into contact with each other on at least one side of the profile. In the illustrated embodiment, for example, a side portion 57 of the first layer 12a and a side portion 53 of the second layer 12b are angled so that they contact each other and form a side of the hollow profile. The other side of the profile is, however, typically left open within the consolidation die 50 so that the discontinuous fiber material can be subsequently applied to the interior of the profile in the pultrusion die. Of course, for those embodiments in which the discontinuous fiber material is not applied to the interior of the hollow profile, the consolidation die 50 may not be employed at all as the entire profile can be optionally shaped within the pultrusion die.

When in the desired position, the layers 12a and 12b of continuous fiber material are pulled into a pultrusion die 60. It is generally desired that the layers are allowed to cool briefly after exiting the consolidation die 50 and before entering the pultrusion die 60. This allows the consolidated laminate to retain its initial shape before progressing further through the system. Such cooling may be accomplished by simply exposing the layers to the ambient atmosphere (e.g., room temperature) or through the use of active cooling techniques (e.g., water bath or air cooling) as is known in the art. In one embodiment, for example, air is blown onto the layers (e.g., with an air ring). The cooling between these stages, however, generally occurs over a small period of time to ensure that the layers are still soft enough to be further shaped. For example, after exiting the consolidation die 50, the layers may be exposed to the ambient environment for only from about 1 to about 20 seconds, and in some embodiments, from about 2 to about 10 seconds, before entering the second die 60.

The configuration of the pultrusion die 60 depends in part on the desired shape and properties for the resulting profile. For hollow profiles, for example, the pultrusion die often contains a mandrel within its interior so that the fiber material flows between the interior surface of the die and the external surface of the mandrel to form the desired shape. Solid profiles, however, are typically formed without a mandrel. Further, although referred to herein as a single die, it should be understood that the pultrusion die 60 may be formed from multiple individual dies. In fact, the pultrusion die may preferably employ a first die section in which the discontinuous material is supplied and shaped a second die section in which the continuous fiber material is shaped. In FIGS. 4-5, for example, a first die section 62 is employed that supplies and shapes discontinuous fiber material 61 and a second die section 64 is employed that shapes the continuous fiber layers 12a and 12b.

Figure 8:
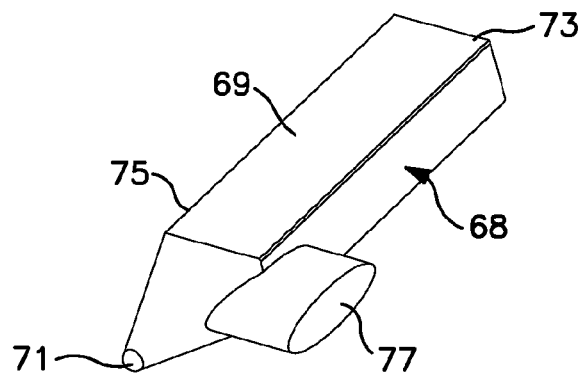
FIG. 8 is an exploded perspective view of one embodiment of a mandrel section that may be employed in the present invention to shape the continuous fiber layer, wherein the flow of the continuous fiber material is also illustrated as it passes over the mandrel.

The particular manner in which the discontinuous fiber material 61 is supplied to the first die section 62 is shown in more detail in FIGS. 6-8. As shown, a discontinuous fiber material 61 enters the first die section 62 and is curved into its interior cavity. Although not required, such a curved inlet allows the discontinuous fiber material 61 to gradually flow into in the direction "A" and toward a die outlet 67. In such embodiments, the angle β at which the discontinuous fiber material is provided relative to the flow direction "A" of the continuous fiber layers 12a and 12b may generally vary, but is typically about 45° or more, in some embodiments about 60° or more, and in some embodiments, from about 75° to about 90°. In certain cases, a non-perpendicular flow angle may be advantageous because it minimizes or overcomes backpressure in the die that may be caused by the high pressure flow of the discontinuous fiber material, which can sometimes lead to an undesirable backflow. The angled input orientation of the discontinuous fiber material, in combination with its curved configuration, may also reduce the likelihood that static spots (dead spots) may form inside the die, which may cause resin degradation, fiber hang-up, or breakage.

Upon entering the first die section 62, the discontinuous material 61 also flows over a mandrel 68. The mandrel 68 may be supported in a cantilever manner so that it resists the forward force of the continuous material being pulled around and over the mandrel. Further, although the entire mandrel is not shown herein, it should be understood that it may nevertheless extend into the aforementioned consolidation die 50 to help "pre-shape" the continuous fiber material in the manner described above. Regardless, the mandrel 68 shown in FIGS. 6-8 possesses multiple sections for accomplishing the desired shaping of the profile. More particularly, the mandrel 68 contains a first mandrel section 69 that is solid and generally rectangular in cross-section. Thus, the discontinuous material 61 passes over and around the mandrel section 69 from its proximal end 71 to its distal end 73. In doing so, the material 61 assumes the shape defined between the interior surface of the first die section 62 and an external surface 75 of the mandrel section 69, which in this embodiment, is a hollow rectangular shape.

Figure 9:
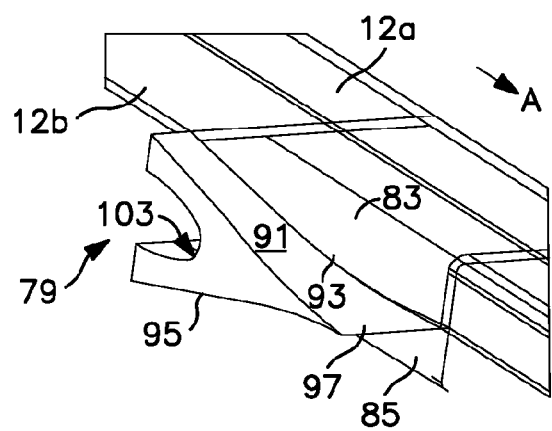
FIG. 9 is a perspective view of the mandrel section of FIG. 8.
Figure 10A:
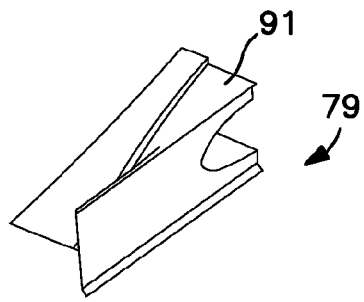
FIG. 10A shows a right perspective view and FIG. 10B shows a left perspective view of the mandrel section.
Figure 10B:
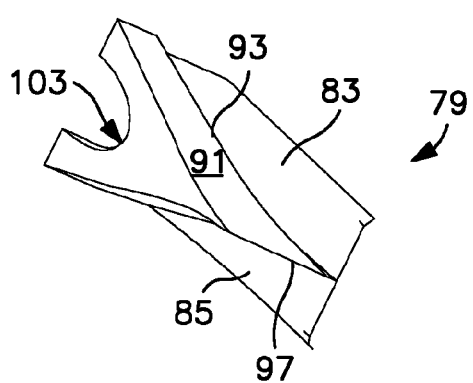

The final shape of the continuous fiber layer is formed in the second die section 64 of the pultrusion die 60, over and around a second section 79 of the mandrel 68 as shown in FIGS. 9-10. The second mandrel section 79 contains a U-shaped recess 103 that engages a protrusion 77 of the first mandrel section 69 for connecting thereto. In this embodiment, the second mandrel section 79 also contains an upper wall 83 and lower wall 85 that are generally perpendicular to the direction "A" of material flow. An upwardly facing surface 91 intersects a curved edge 93 of the upper wall 83 and slopes axially in the direction "A". Similarly, a downwardly facing surface 95 intersects a curved edge of the lower wall 85 and slopes axially in the direction "A". The surfaces 91 and 95 both converge at an edge 97. During formation of the profile, the first layer 12a of continuous fiber material is pulled over the surface 91 and assumes the shape defined between an interior surface of the pultrusion die 60 and the upper wall 83. The second layer 12b of continuous fiber material is pulled over the surface 95 and likewise assumes the shape defined between an interior surface of the pultrusion die 60 and the lower wall 85. The layer 12a and 12b are also gradually pulled into contact with each other at the edge 97 to form one side of the resulting profile. If necessary, the materials may be subjected to a subsequent compression step, such as in a land die section (not shown), to further increase the degree of adhesion between the layers at their edges.

Within the die 60, the ribbons are generally maintained at a temperature well above the melting point of the thermoplastic matrix used in the ribbon to facilitate the ability to shape the part and intermix together the discontinuous fiber material. However, the temperature is not so high as to destroy the integrity of the material. The temperature may, for example, range from about 100° C. to about 350° C., in some embodiments from about 120° C. to about 320° C., and in some embodiments, from about 150° C. to about 300° C.

If desired, the resulting profile may also be applied with a capping layer to enhance the aesthetic appeal of the profile and/or protect it from environmental conditions. Referring to FIG. 1, for example, such a capping layer may be applied via an extruder oriented at any desired angle to introduce a thermoplastic resin into a capping die 72. The resin may contain any suitable thermoplastic polymer known in the art that is generally compatible with the thermoplastic polymer used to form the profile. Suitable capping polymers may include, for instance, acrylic polymers, polyvinyl chloride (PVC), polybutylene terephthalate (PBT), ABS, polyolefins, polyesters, polyacetals, polyamids, polyurethanes, etc. Although the capping resin is generally free of fibers, it may nevertheless contain other additives for improving the final properties of the profile. Additive materials employed at this stage may include those that are not suitable for incorporating into the continuous fiber or discontinuous fiber layers. For instance, it may be desirable to add pigments to the composite structure to reduce finishing labor of shaped articles, or it may be desirable to add flame retardant agents to the composite structure to enhance the flame retarding features of the shaped article. Because many additive materials are heat sensitive, an excessive amount of heat may cause them to decompose and produce volatile gases. Therefore, if a heat sensitive additive material is extruded with an impregnation resin under high heating conditions, the result may be a complete degradation of the additive material. Additive materials may include, for instance, mineral reinforcing agents, lubricants, flame retardants, blowing agents, foaming agents, ultraviolet light resistant agents, thermal stabilizers, pigments, and combinations thereof. Suitable mineral reinforcing agents may include, for instance, calcium carbonate, silica, mica, clays, talc, calcium silicate, graphite, calcium silicate, alumina trihydrate, barium ferrite, and combinations thereof.

While not shown in detail herein, the capping die 72 may include various features known in the art to help achieve the desired application of the capping layer. For instance, the capping die 72 may include an entrance guide that aligns the incoming profile. The capping die may also include a heating mechanism (e.g., heated plate) that pre-heats the profile before application of the capping layer to help ensure adequate bonding.

Following optional capping, the shaped part 15 is then finally cooled using a cooling system 80 as is known in the art. The cooling system 80 may, for instance, be a vacuum sizer that includes one or more blocks (e.g., aluminum blocks) that completely encapsulate the profile while a vacuum pulls the hot shape out against its walls as it cools. A cooling medium may be supplied to the sizer, such as air or water, to solidify the profile in the correct shape.

Vacuum sizers are typically employed when forming the profile. Even if a vacuum sizer is not employed, however, it is generally desired to cool the profile after it exits the capping die (or the consolidation or calibration die if capping is not applied). Cooling may occur using any technique known in the art, such a vacuum water tank, cool air stream or air jet, cooling jacket, an internal cooling channel, cooling fluid circulation channels, etc. Regardless, the temperature at which the material is cooled is usually controlled to achieve optimal mechanical properties, part dimensional tolerances, good processing, and an aesthetically pleasing composite. For instance, if the temperature of the cooling station is too high, the material might swell in the tool and interrupt the process. For semi-crystalline materials, too low of a temperature can likewise cause the material to cool down too rapidly and not allow complete crystallization, thereby jeopardizing the mechanical and chemical resistance properties of the composite. Multiple cooling die sections with independent temperature control can be utilized to impart the optimal balance of processing and performance attributes. In one particular embodiment, for example, a vacuum water tank is employed that is kept at a temperature of from about 10° C. to about 50° C., and in some embodiments, from about 15° C. to about 35° C.

As will be appreciated, the temperature of the profile as it advances through any section of the system of the present invention may be controlled to yield optimal manufacturing and desired final composite properties. Any or all of the assembly sections may be temperature controlled utilizing electrical cartridge heaters, circulated fluid cooling, etc., or any other temperature controlling device known to those skilled in the art.

Referring again to FIG. 1, a pulling device 82 is positioned downstream from the cooling system 80 that pulls the finished profile 16 through the system for final sizing of the composite. The pulling device 82 may be any device capable of pulling the profile through the process system at a desired rate. Typical pulling devices include, for example, caterpillar pullers and reciprocating pullers. If desired, one or more calibration dies (not shown) may also be employed. Such dies contain openings that are cut to the exact profile shape, graduated from oversized at first to the final profile shape. As the profile passes therethrough, any tendency for it to move or sag is counteracted, and it is pushed back (repeatedly) to its correct shape. Once sized, the profile may be cut to the desired length at a cutting station (not shown), such as with a cut-off saw capable of performing cross-sectional cuts.

Figure 11:
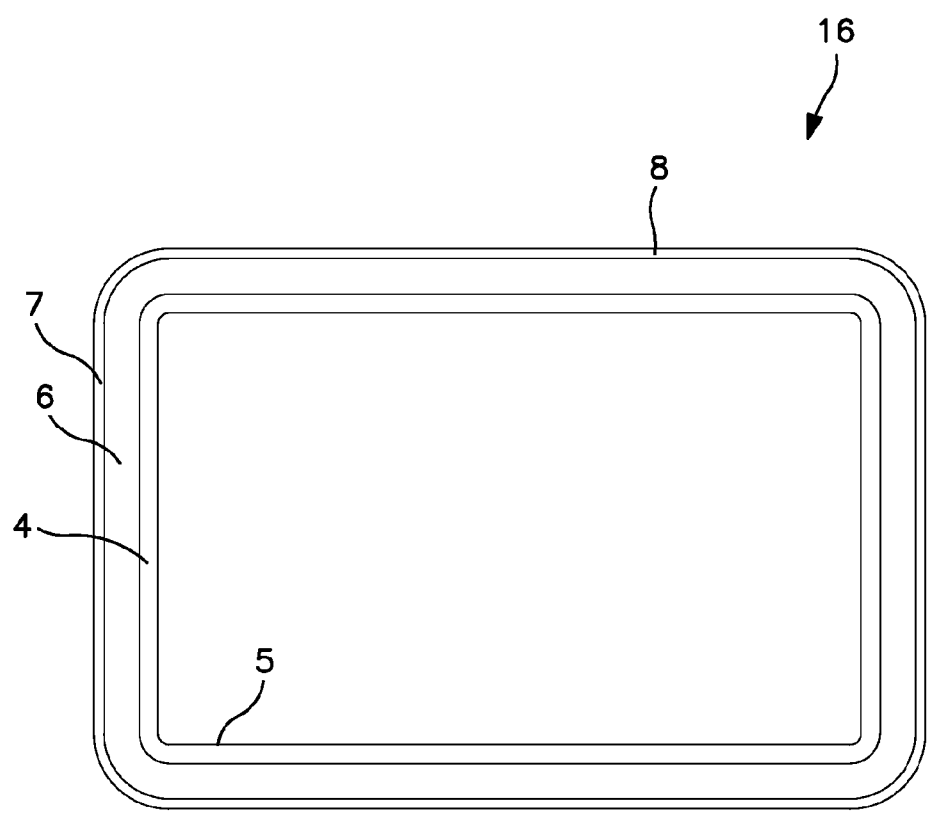
FIG. 11 is a cross-sectional view of one embodiment of a rectangular, hollow profile that may be formed in accordance with the present invention.

The resulting profile 16 is shown in more detail in FIG. 11. As illustrated, the profile 16 generally has a hollow, rectangular shape. An inner layer 4 is formed by the discontinuous fiber material that extends around the entire profile and defines an interior surface 5. An outer layer 6 is likewise formed by the continuous fiber material that extends around the perimeter of the inner layer 4 and positioned adjacent thereto. The thickness of these layers and the relative proportion of the discontinuous and continuous fiber materials may be strategically selected to help achieve a particular tensile strength and transverse strength (e.g., flexural modulus) for the profile. For example, higher percentages of discontinuous fiber material (and/or thickness) generally result in higher transverse strength, while higher percentages of continuous fiber material (and/or thickness) generally result in higher tensile strength.

To optimize these properties, the ratio of the weight of the continuous fiber layer to the weight of the discontinuous fiber layer is typically from about 0.2 to about 10, in some embodiments from about 0.4 to about 5, and in some embodiments, from about 0.5 to about 4. For instance, continuous fibers may constitute from about 10 wt. % to about 90 wt. %, in some embodiments from about 20 wt. % to about 70 wt. %, and in some embodiments, from about 30 wt. % to about 60 wt. % of the profile. Likewise, long fibers may constitute from about 0.5 wt. % to about 50 wt. %, in some embodiments from about 1 wt. % to about 40 wt. %, and in some embodiments, from about 2 wt. % to about 30 wt. % of the profile. In this regard, the thickness of the inner layer 4 may be from about 0.1 to about 2.0 millimeters, in some embodiments from about 0.5 to about 1.5 millimeters, and in some embodiments, from about 0.6 to about 1.2 millimeters, and the thickness of the outer layer 6 may be from about 0.2 to about 4.0 millimeters, in some embodiments from about 0.5 to about 3.0 millimeters, and in some embodiments, from about 1.0 to about 2.0 millimeters. The total thickness of the layers 4 and 6 may likewise be from about 1.0 to about 4.0 millimeters, and in some embodiments, from about 2.0 to about 3.0 millimeters.

The profile 16 of FIG. 11 also includes a capping layer 7 that extends around the perimeter of the outer layer 6 and defines an external surface 8 of the profile 16. The thickness of the capping layer 7 depends on the intended function of the part, but is typically from about 0.1 to about 5 millimeters, and in some embodiments, from about 0.2 to about 3 millimeters.

Figure 12:
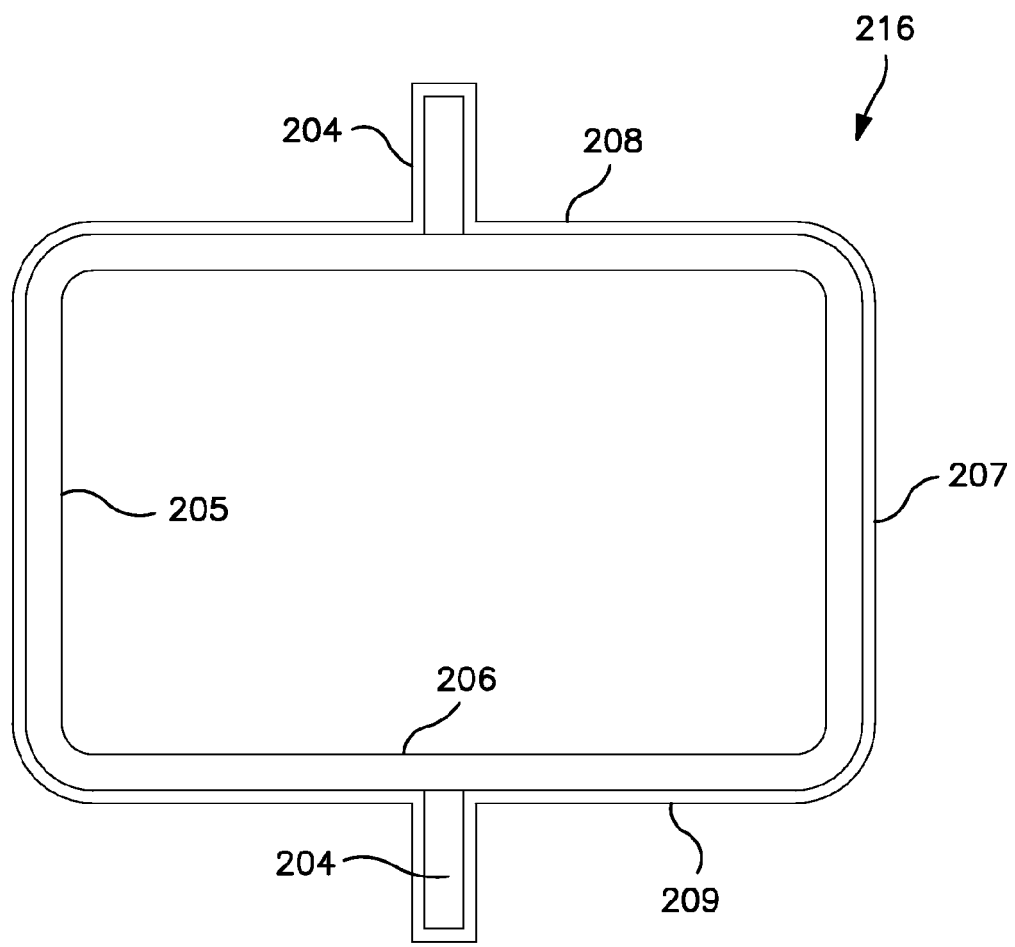
FIG. 12 is a cross-sectional view of another embodiment of a rectangular, hollow profile that may be formed in accordance with the present invention.

In the embodiments described and shown above, the discontinuous fiber material is positioned around substantially the entire interior perimeter of the profile. However, it should be understood that this is not required, and that it may be desired in certain applications to apply the material only to specific locations that are advantageous according to a particular design. One example of such a profile is shown in more detail in FIG. 12. As illustrated, the profile 216 generally has a hollow, rectangular shape. In this embodiment, an inner layer 206 is formed by the continuous fiber material that extends around the entire profile and defines an interior surface 205. The thickness of the layer 206 may be similar to the continuous fiber layer described above with reference to FIG. 11. Contrary to the embodiment of FIG. 11, however, the profile 216 does not contain a discontinuous fiber layer. Instead, discontinuous fiber material is located at discrete layers 204 at upper and lower surfaces 208 and 209 of the profile 216. Such discrete placement of the discontinuous fiber material may provide enhanced transverse strength at only those locations where it is needed for a particular application. A capping layer 207 may cover the periphery of the profile 216.

FIGS. 13-14 illustrate one embodiment of the consolidation die 250 and pultrusion die 260 that may be employed to form the profile 216. Similar to the embodiments described above, the consolidation die 250 in this embodiment receives a first layer 212a and second layer 212b of continuous fiber material at an inlet end 256. The layers 212a and 212b are guided through channels (not shown) of the die 250 in a direction "A". As they pass through the channels, the widths of the layers 212a and/or 212b are optionally ribboned and connected at one side as described above. When in the desired position, the layers 212a and 212b are pulled into the pultrusion die 260, which employs a first die section 262, a second die section 264, and a mandrel 268 that extends therethrough. Together, each of these components helps shape the continuous fiber material. More particularly, as the continuous fiber layers pass over and around the mandrel 268 from its proximal to distal end, they assume the shape defined between the interior surface of the die 260 and an external surface of the mandrel, which in this embodiment, is a hollow rectangular shape. The discontinuous fiber material 281 is then introduced into a third die section 280 via an inlet portion, which is typically in the form of a cross-head die that extrudes the material at an input angle as mentioned above. In this particular embodiment, however, the discontinuous fiber material 281 is split into an upper stream 240 and a lower stream 242 within the third die section 280. As the streams 240 and 242 converge in the direction "A" of the material flow and are pulled through the die system, they form the upper and lower discrete layers 204, respectively, of the profile 216. A capping layer 207 may then be applied using a capping die 272 as shown.

Figure 15:
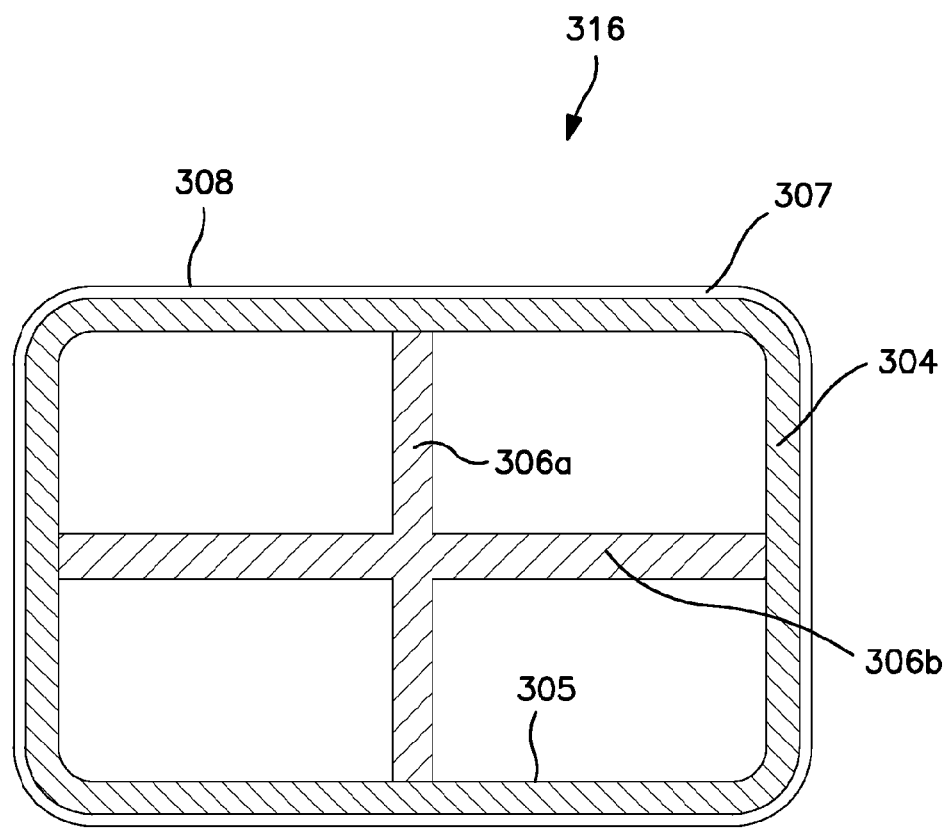
FIG. 15 is a cross-sectional view of yet another embodiment of a rectangular, hollow profile that may be formed in accordance with the present invention.

Of course, other hollow profiles may be formed in the present invention. Referring to FIG. 15, for example, another embodiment of a generally rectangular, hollow profile 316 is shown in more detail. In this particular embodiment, an inner layer 304 is formed by the discontinuous fiber material that extends around the entire profile and defines an interior surface 305. The thickness of the layer 304 may be similar to the discontinuous fiber layer described above with reference to FIG. 11. Contrary to the embodiment of FIG. 11, however, the profile 316 does not contain a continuous fiber layer around the periphery of the profile. Instead, the continuous fiber material is provided as a discrete vertical layer 306a and horizontal layer 306b within the interior of the profile 316. A capping layer 307 is likewise provided that extends around the periphery of the inner layer 304 and defines an external surface 308 of the profile 316.

Figure 16:
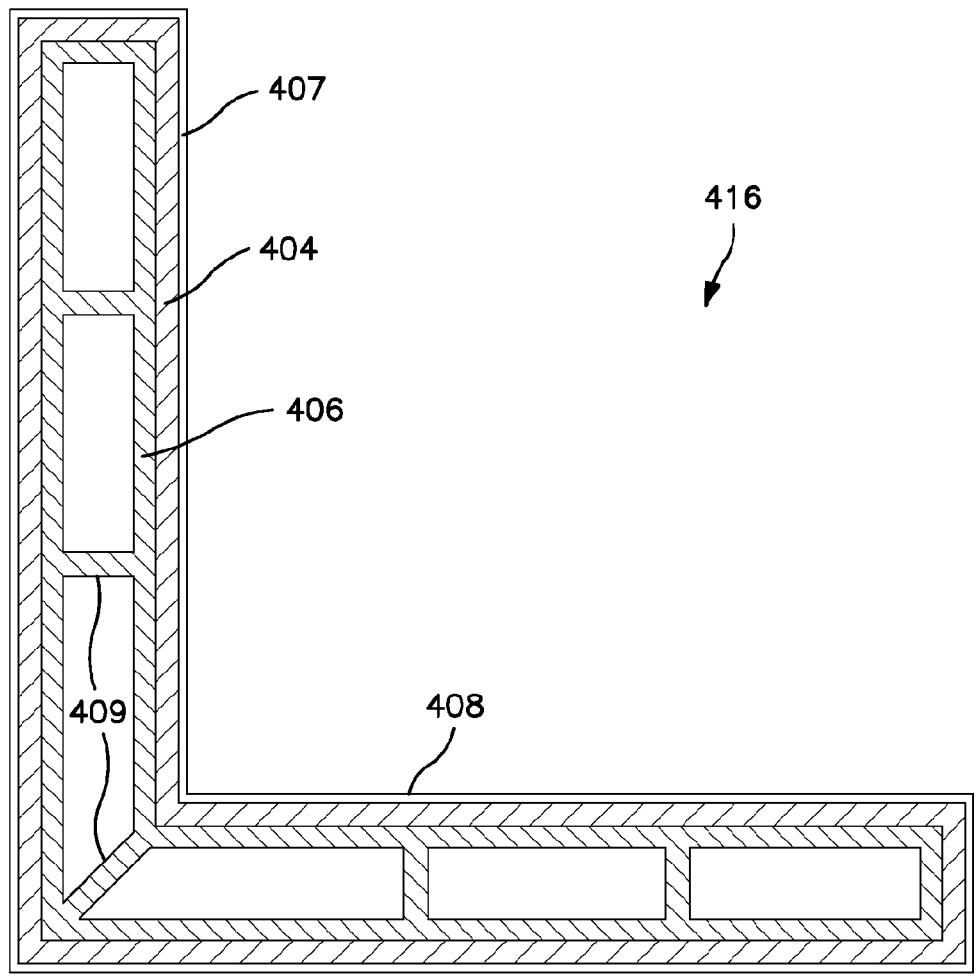
FIG. 16 is a cross-sectional view of one embodiment of an L-shaped, hollow profile that may be formed in accordance with the present invention.

Still another embodiment of a hollow profile is shown in FIG. 16. In this embodiment, the profile 416 has a generally L-shaped cross-section. An inner layer 406 of the L-shaped profile 416 may include the continuous fiber material and an outer layer 404 may include the discontinuous fiber material. Discrete layers 409 of discrete continuous fiber material may also be employed. Further, a capping layer 407 may extend around the entire periphery of the profile 416 and define an external surface 408 thereof.

Figure 17:
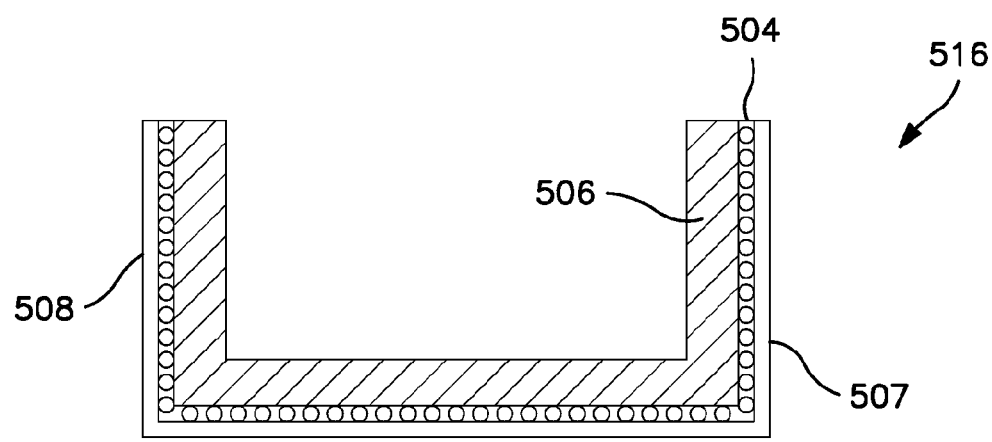
FIG. 17 is a cross-sectional view of one embodiment of a U-shaped, solid profile that may be formed in accordance with the present invention.
Figure 18:
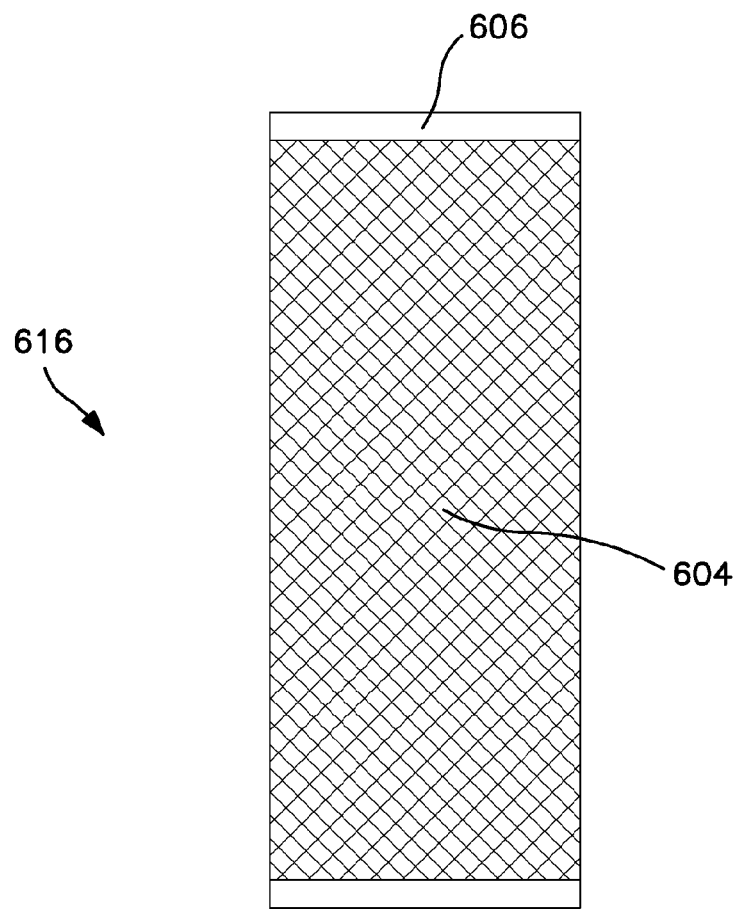
FIG. 18 is a cross-sectional view of one embodiment of a rectangular, solid profile that may be formed in accordance with the present invention.
Figure 19:
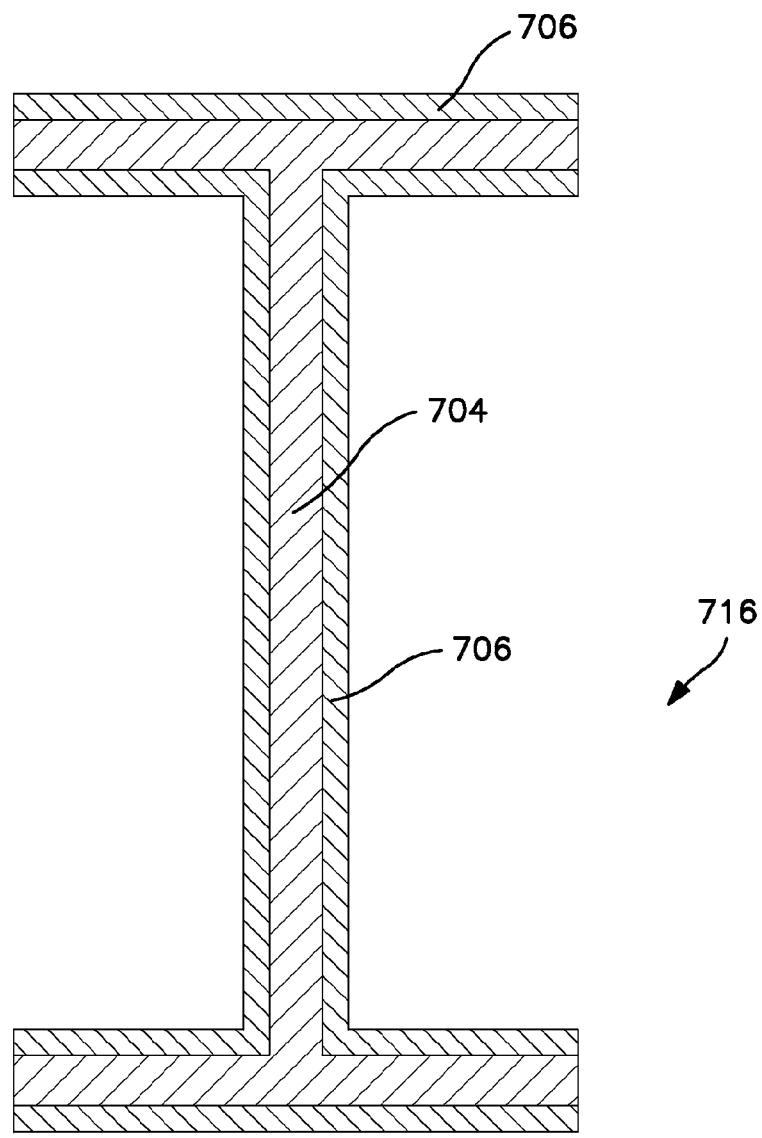
FIG. 19 is a cross-sectional view of one embodiment of an I-shaped, solid profile that may be formed in accordance with the present invention.

In addition to hollow profiles, the unique method and system of the present invention may also be employed to form solid profiles. One such embodiment is a U-shaped or C-shaped solid profile 516 as shown in FIG. 17. In this particular embodiment, an inner layer 506 of the profile 516 may include the continuous fiber material and an outer layer 504 may include the discontinuous fiber material. The thicknesses and relative weight percentages of each layer may within the ranges described above with respect to the embodiment shown in FIG. 11. A capping layer 507 may also extend around the entire periphery of the profile 516 and define an external surface 508 thereof. Still another suitable solid profile has a generally rectangular shape as shown in FIG. 18. In this embodiment, the profile 616 contains a base layer 604 that is typically formed from discontinuous fiber material and exterior layers 606 adjacent thereto that are typically formed from the continuous fiber material. Yet another embodiment of such a profile is shown in FIG. 20 in the shape of an I-beam. In this particular embodiment, the profile 716 may include an interior layer 704 formed from discontinuous fiber material and exterior layers 706 formed from discontinuous fiber material.

As will be appreciated, the particular profile embodiments described above are merely exemplary of the numerous designs that are made possible by the present invention. Among the various possible profile designs, it should be understood that additional layers of continuous and/or discontinuous fiber material may be employed in addition to those described above. Further, the embodiments described above are generally considered "lineal" profiles to the extent that they possess a cross-sectional shape that is substantially the same along the entire length of the profile. It should be understood, however, that profiles may also be formed in the present invention that have a varying cross-sectional shape, such as curved, twisted, etc.

Although not limited to any particular design, the profiles of the present invention can achieve enhanced strength properties as referenced above. For example, the profiles may exhibit a relatively high flexural modulus and maximum flexural strength (in the transverse direction) in comparison to profiles having the same shape and size, but lacking the selective discontinuous fiber reinforcement of the present invention. The term "flexural modulus" generally refers to the ratio of stress to strain in flexural deformation (units of force per area), or the tendency for a material to bend. It is determined from the slope of a stress-strain curve produced by a "three point flexural" test (such as ASTM D790-10,Procedure A or ISO 178). For example, the profile of the present invention may exhibit a flexural modulus of about 2 Gigapascals ("GPa") or more, in some embodiments from about 2 to about 25 GPa, in some embodiments from about 4 to about 20 GPa, and in some embodiments, from about 5 to about 15 GPa. Furthermore, the maximum flexural strength (also known as the modulus of rupture or bend strength) may be about 12 Megapascals ("MPa") or more, in some embodiments from about 15 to about 50 MPa, and in some embodiments, from about 20 to about 40 MPa. The term "maximum flexural strength" generally refers to the maximum stress reached on a stress-strain curve produced by a "three point flexural" test (such as ASTM D790-10,Procedure A or ISO 178) in the transverse direction at room temperature. It represents the ability of the material to withstand an applied stress in the transverse direction to failure. The ratio of flexural modulus to maximum flexural strength is also controlled to achieve a balance between transverse strength and modulus. For example, the ratio may range from about 50 to about 2200,in some embodiments from about 100 to about 1000,in some embodiments from about 200 to about 800,and in some embodiments, from about 250 to about 600.

The profile may also have a very low void fraction, such as about 3% or less, in some embodiments about 2% or less, and in some embodiments, about 1% or less. The void fraction may be determined in the manner described above, such as using a "resin burn off" test in accordance with ASTM D 2584-08.

The present disclosure may be better understood with reference to the following example.

EXAMPLE

Continuous fiber ribbons were initially formed using an extrusion system as substantially described above and shown in FIGS. 2-3. Glass fiber rovings (E-glass, 2200 tex) were employed for the continuous fibers with each individual ribbon containing three (3) fiber rovings. The thermoplastic polymer used to impregnate the fibers was acrylonitrile butadiene styrene (ABS), which has a melting point of about 105° C. Each ribbon contained 60 wt. % glass fibers and 40 wt. % ABS. The resulting ribbons had a thickness of between 0.2 to 0.4 millimeters and a void fraction of less than 1%.

Once formed, the ribbons were then fed to an extrusion/pultrusion line operating at a speed of 5 feet per minute. Prior to consolidation, the ribbons were heated within an infrared oven (power setting of 160). The heated ribbons were then supplied to a consolidation die having a U-shaped channel that received the ribbons and consolidated them together while forming the initial shape of the profile. Within the die, the ribbons remained at a temperature of about 121° C., just above the melting point of the ABS matrix. Upon consolidation, the resulting laminate was then briefly cooled with ambient air. The laminate was then passed through the pultrusion die as shown in FIG. 1. Long fiber pellets were applied to the interior section of the U-shaped profile at 246° C. The resulting part was then supplied to a 1-inch land section to impart the final solid "U shape" and cooled using an oil cooled sizing unit set at a temperature of about 26° C. Air cooling was then employed to complete the cooling process. The profile had a thickness of approximately 3.2 millimeters and a width of approximately 40 millimeters.

Ten (10) different U-shaped profile samples were formed as described above with different amounts of continuous fibers and long fibers. The amount of long fibers was varied by using different percentages of long fibers in the pellets, ranging from 0 wt. % to 40.%, and the amount of continuous fibers was varied by using different numbers of ribbons, ranging from 2 to 7. The manner in which each of the samples was formed is reflected below in Table 1.

TABLE 1

| Sample | Long Fibers in Pellets (wt. %) | Number of Continuous Fiber Ribbons | Wt. Ratio of Continuous Fiber Material to Long Fiber Material |
|---|---|---|---|
| 1 | 0 | 7 | — |
| 2 | 20 | 2 | 1.21 |
| 3 | 20 | 3 | 1.99 |
| 4 | 20 | 4 | 3.20 |
| 5 | 30 | 2 | 0.72 |
| 6 | 30 | 3 | 1.54 |
| 7 | 30 | 4 | 2.34 |
| 8 | 40 | 2 | 0.57 |
| 9 | 40 | 3 | 0.95 |
| 10 | 40 | 4 | 1.52 |

To determine the strength properties of the profile, three-point flexural testing was performed in accordance with ASTM D790-10, Procedure A. One transverse edge of the profile was supported with a fixture, and the load from the Instron meter was applied to the free edge of the U profile. The following equation was used to calculate the maximum stress load on the part: Maximum stress load=$(6*P_{max}*L)/w*t^2$ where $P_{max}$=maximum load, L=length of lever arm, w=sample width, t=sample thickness. The strength properties of the samples are set forth below in Table 2.

TABLE 2

| Sample | Maximum Flexural Strength (MPa) | Flexural Modulus (GPa) | Ratio of Flexural Modulus to Flexural Strength |
|---|---|---|---|
| 1 | 11.73 | 26.6 | 2268 |
| 2 | 35.39 | 6.2 | 175 |
| 3 | 32.36 | 8.7 | 269 |
| 4 | 32.76 | 13.7 | 418 |
| 5 | 30.94 | 7.87 | 254 |
| 6 | 27.17 | 13.55 | 499 |
| 7 | 26.57 | 14.87 | 560 |
| 8 | 27.93 | 11.82 | 423 |
| 9 | 26.57 | 13.75 | 518 |
| 10 | 29.66 | 14.75 | 497 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for forming a pultruded profile having a cross-sectional shape, the method comprising:
   pulling a continuous fiber ribbon through a pultrusion die in a longitudinal direction, wherein the continuous fiber ribbon contains continuous fibers that are substantially oriented in the longitudinal direction and embedded within a first thermoplastic polymer matrix;
   introducing a discontinuous fiber material into the pultrusion die, wherein the discontinuous fiber material contains discontinuous fibers embedded within a second thermoplastic matrix, and wherein the discontinuous fiber material is introduced into the pultrusion die by providing the discontinuous fiber material at an input angle relative to the longitudinal direction, wherein the input angle is about 45° or more, and flowing the provided discontinuous fiber material through a curved inlet from the input angle to the longitudinal direction such that the discontinuous fiber material flows in the longitudinal direction before combining the discontinuous fiber material and the continuous fiber ribbon; and
   within the pultrusion die, combining the discontinuous fiber material and the continuous fiber ribbon to form first and second layers of the profile, wherein the first layer is positioned adjacent to the second layer and includes the discontinuous fiber material, and wherein the second layer includes the continuous fiber ribbon.

2. The method of claim 1 wherein the continuous fibers, the discontinuous fibers, or both, include glass fibers, carbon fibers, or a combination of glass and carbon fibers.

3. The method of claim 1, wherein the first thermoplastic polymer matrix, the second thermoplastic polymer matrix, or both, include a polyolefin, polyether ketone, polyetherimide, polyarylene ketone, liquid crystal polymer, polyarylene sulfide, fluoropolymer, polyacetal, polyurethane, polycarbonate, styrenic polymer, polyester, polyimide, or a combination thereof.

4. The method of claim 1, wherein the first thermoplastic matrix includes a first thermoplastic polymer and the second thermoplastic matrix includes a second thermoplastic polymer, wherein the first and second thermoplastic polymers are the same.

5. The method of claim 1, wherein the continuous fiber ribbon has a void fraction of about 2% or less.

6. The method of claim 1, wherein the continuous fiber ribbon is formed by a method that comprises:
passing the continuous fibers through an extrusion device that defines a tortuous pathway for impregnating the fibers with the first thermoplastic polymer matrix; and
thereafter, consolidating the impregnated fibers into the ribbon.

7. The method of claim 6, wherein a manifold assembly supplies the thermoplastic matrix to the extrusion device, the manifold assembly comprising branched runners through which the thermoplastic matrix flows.

8. The method of claim 6, wherein the continuous fibers are under tension when impregnated with the thermoplastic matrix.

9. The method of claim 1, wherein the thermoplastic polymer matrix constitutes from about 10 wt.% to about 60 wt.% of the ribbon and the continuous fibers constitutes from about 40 wt.% to about 90 wt% of the ribbon.

10. The method of claim 1, wherein the discontinuous fibers include long fibers.

11. The method of claim 1, further comprising pulling the continuous fiber ribbon through a consolidation die that is positioned upstream from the pultrusion die.

12. The method of claim 1, wherein at least a portion of the discontinuous fibers are oriented at an angle relative to the longitudinal direction.

13. The method of claim 1, wherein the input angle is from about 75° to about 90°.

14. The method of claim 1 wherein a first mandrel section is positioned within an interior of the pultrusion die, the discontinuous fiber material flowing over the first mandrel section to assume a shape that is defined between an external surface of the first mandrel section and an interior surface of the pultrusion die.

15. The method of claim 14, wherein a second mandrel section is also positioned within the interior of the pultrusion die, the continuous fiber ribbon flowing over the second mandrel section to assume a shape that is defined between an external surface of the second mandrel section and an interior surface of the pultrusion die.

16. The method of claim 1, wherein multiple layers of continuous fiber ribbon are pulled through the pultrusion die and brought together to form the second layer of the profile.

17. The method of claim 1, further comprising applying a capping layer to the first layer, the second layer, or both.

18. The method of claim 1, further comprising cooling the shaped profile to solidify the first and second layers into position.

19. The method of claim 1, wherein the ratio of the weight of the second layer to the weight of the first layer is from about 0.2 to about 10.

20. The method of claim 1, Wherein the second layer has a thickness of from about 0.5 to about 3.0 millimeters and the thickness of the first layer is from about 0.5 to about 1.5 millimeters.

21. The method of claim 1, wherein the profile is hollow.

22. The method of claim 21 wherein the hollow profile has a generally rectangular shape.

23. The method of claim 21, wherein the first layer forms an inner layer of the hollow profile.

24. The method of claim 23, wherein the second layer extends substantially around the periphery of the first layer.

25. The method of claim 23, wherein the second layer is located in one or more discrete regions adjacent to the first layer.

26. The method of claim 21, wherein the second layer forms an inner layer of the hollow profile.

27. The method of claim 26, wherein the first layer extends substantially around the periphery of the second layer.

28. The method of claim 26, wherein the first layer is located in one or more discrete regions adjacent to the second layer.

29. The method of claim 1, wherein the profile is solid.

30. The method of claim 29, wherein the solid profile is U- or C-shaped.

31. The method of claim 1, wherein the cross-section shape of the profile is substantially the same along the entire length of the profile.

* * * * *